(12) United States Patent
Gholmieh et al.

(10) Patent No.: US 11,627,490 B2
(45) Date of Patent: Apr. 11, 2023

(54) INTEGRITY PROTECTION AT PACKET DATA CONVERGENCE PROTOCOL LAYER

(71) Applicant: QUALCOMM Incorporated, San Diego, CA (US)

(72) Inventors: Aziz Gholmieh, Del Mar, CA (US); Gavin Bernard Horn, La Jolla, CA (US); Leena Zacharias, San Jose, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 16/680,394

(22) Filed: Nov. 11, 2019

(65) Prior Publication Data

US 2020/0169916 A1 May 28, 2020

Related U.S. Application Data

(60) Provisional application No. 62/771,370, filed on Nov. 26, 2018.

(51) Int. Cl.
*H04W 28/04* (2009.01)
*H04L 69/22* (2022.01)
*H04W 12/106* (2021.01)
*H04W 80/02* (2009.01)

(52) U.S. Cl.
CPC ............ *H04W 28/04* (2013.01); *H04L 69/22* (2013.01); *H04W 12/106* (2021.01); *H04W 80/02* (2013.01)

(58) Field of Classification Search
CPC ... H04W 12/106; H04W 28/04; H04W 80/02; H04W 12/61; H04L 69/22; H04L 1/1642
See application file for complete search history.

(56) References Cited

U.S. PATENT DOCUMENTS

| | | |
|---|---|---|
| 2008/0010677 A1 | 1/2008 | Kashima et al. |
| 2015/0280905 A1 | 10/2015 | Shah et al. |
| 2017/0201960 A1* | 7/2017 | Park ..................... H04L 5/0051 |

(Continued)

FOREIGN PATENT DOCUMENTS

WO    WO-2018084668 A1    5/2018

OTHER PUBLICATIONS

Partial International Search Report—PCT/US2019/061009—ISAEPO—dated Mar. 19, 2020.

(Continued)

*Primary Examiner* — Syed Ali
(74) *Attorney, Agent, or Firm* — Qualcomm Incorporated

(57) ABSTRACT

Methods, systems, and devices for wireless communications are described. A transmitting device may associate, at a first protocol layer, a first sequence number to a data packet to perform integrity protection on at least a portion of the data packet. The transmitting device may associate, at the first protocol layer, a second sequence number to the data packet for wireless transmission to a receiving device. The transmitting device may indicate an offset between the first sequence number and the second sequence number in the data packet. The transmitting device may transmit the data packet to a second protocol layer for wireless transmission to the receiving device, the second protocol layer being a lower layer than the first protocol layer.

18 Claims, 17 Drawing Sheets

(56) References Cited

U.S. PATENT DOCUMENTS

| | | | |
|---|---|---|---|
| 2017/0257193 A1* | 9/2017 | Yan | H04L 27/26035 |
| 2019/0045527 A1* | 2/2019 | Shimezawa | H04L 1/1854 |
| 2019/0052332 A1* | 2/2019 | Shimezawa | H04W 72/0446 |
| 2019/0245800 A1* | 8/2019 | Kim | H04W 28/06 |
| 2019/0349426 A1* | 11/2019 | Smith | H04L 9/0825 |
| 2020/0337002 A1* | 10/2020 | Ko | H04W 72/005 |
| 2021/0266786 A1* | 8/2021 | Dudda | H04W 24/10 |

OTHER PUBLICATIONS

International Search Report and Written Opinion—PCT/US2019/061009—ISA/EPO—dated Jul. 1, 2020.

* cited by examiner

INTEGRITY PROTECTION AT PACKET DATA CONVERGENCE PROTOCOL LAYER

CROSS REFERENCE

The present application for patent claims the benefit of U.S. Provisional Patent Application No. 62/771,370 by GHOLMIEH, et al., entitled "INTEGRITY PROTECTION AT PACKET DATA CONVERGENCE PROTOCOL LAYER," filed Nov. 26, 2018, assigned to the assignee hereof, and expressly incorporated herein.

INTRODUCTION

The following relates generally to wireless communications, and more specifically to integrity protection at a protocol layer.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication devices may operate according to a layered protocol, which may be referred to as the protocol stack. For example, the protocol stack may be implemented by UE and base stations (or network devices) operating on the wireless network, with each layer of the protocol stack responsible for its own corresponding function(s).

SUMMARY

A method of wireless communication at a first device is described. The method may include associating, at a first protocol layer, a first sequence number (SN) to a data packet to perform integrity protection on at least a portion of the data packet, associating, at the first protocol layer, a second SN to the data packet for wireless transmission to a second device, indicating an offset between the first SN and the second SN in the data packet, and transmitting the data packet to a second protocol layer for wireless transmission to the second device, the second protocol layer being a lower layer than the first protocol layer.

An apparatus for wireless communication at a first device is described. The apparatus may include a processor and memory coupled to the processor. The processor and the memory may be configured to associate, at a first protocol layer, a first SN to a data packet to perform integrity protection on at least a portion of the data packet, associate, at the first protocol layer, a second SN to the data packet for wireless transmission to a second device, indicate an offset between the first SN and the second SN in the data packet, and transmit the data packet to a second protocol layer for wireless transmission to the second device, the second protocol layer being a lower layer than the first protocol layer.

Another apparatus for wireless communication at a first device is described. The apparatus may include means for associating, at a first protocol layer, a first SN to a data packet to perform integrity protection on at least a portion of the data packet, associating, at the first protocol layer, a second SN to the data packet for wireless transmission to a second device, indicating an offset between the first SN and the second SN in the data packet, and transmitting the data packet to a second protocol layer for wireless transmission to the second device, the second protocol layer being a lower layer than the first protocol layer.

A non-transitory computer-readable medium storing code for wireless communication at a first device is described. The code may include instructions executable by a processor to associate, at a first protocol layer, a first SN to a data packet to perform integrity protection on at least a portion of the data packet, associate, at the first protocol layer, a second SN to the data packet for wireless transmission to a second device, indicate an offset between the first SN and the second SN in the data packet, and transmit the data packet to a second protocol layer for wireless transmission to the second device, the second protocol layer being a lower layer than the first protocol layer.

Some examples of the method, apparatuses, and non-transitory computer-readable medium described herein may further include operations, features, means, or instructions for determining that a priority level associated with the data packet satisfies a threshold, and associating the second SN to the data packet based on the priority level.

Some examples of the method, apparatuses, and non-transitory computer-readable medium described herein may further include operations, features, means, or instructions for determining that an expiry timer associated with a previously received data packet may have expired, and associating the second SN to the data packet based on the expiry timer expiration.

In some examples of the method, apparatuses, and non-transitory computer-readable medium described herein, indicating the offset may include operations, features, means, or instructions for indicating the second SN in a first field of a header portion of the data packet, and indicating the offset in a second field of the header portion of the data packet.

Some examples of the method, apparatuses, and non-transitory computer-readable medium described herein may further include operations, features, means, or instructions for performing integrity protection on a data portion of the data packet using the first SN.

Some examples of the method, apparatuses, and non-transitory computer-readable medium described herein may further include operations, features, means, or instructions for determining that the second SN may be different from the first SN, where the data packet indicating the offset may be based on the second SN being different from the first SN.

Some examples of the method, apparatuses, and non-transitory computer-readable medium described herein may further include operations, features, means, or instructions for indicating the first SN in a header portion of the data packet.

In some examples of the method, apparatuses, and non-transitory computer-readable medium described herein, the first protocol layer includes a packet data convergence protocol (PDCP) layer.

A method of wireless communication at a second device is described. The method may include receiving a data packet from a first device, the data packet indicating an offset between a first SN associated with the data packet to perform integrity verification and a second SN associated with the data packet for wireless transmission from the first device, identifying the first SN based on the second SN and the indicated offset, performing integrity verification on the data packet according to the first SN, and performing data packet ordering operations according to the second SN.

An apparatus for wireless communication at a second device is described. The apparatus may include a processor and memory coupled to the processor. The processor and the memory may be configured to receive a data packet from a first device, the data packet indicating an offset between a first SN associated with the data packet to perform integrity verification and a second SN associated with the data packet for wireless transmission from the first device, identify the first SN based on the second SN and the indicated offset, perform integrity verification on the data packet according to the first SN, and perform data packet ordering operations according to the second SN.

Another apparatus for wireless communication at a second device is described. The apparatus may include means for receiving a data packet from a first device, the data packet indicating an offset between a first SN associated with the data packet to perform integrity verification and a second SN associated with the data packet for wireless transmission from the first device, identifying the first SN based on the second SN and the indicated offset, performing integrity verification on the data packet according to the first SN, and performing data packet ordering operations according to the second SN.

A non-transitory computer-readable medium storing code for wireless communication at a second device is described. The code may include instructions executable by a processor to receive a data packet from a first device, the data packet indicating an offset between a first SN associated with the data packet to perform integrity verification and a second SN associated with the data packet for wireless transmission from the first device, identify the first SN based on the second SN and the indicated offset, perform integrity verification on the data packet according to the first SN, and perform data packet ordering operations according to the second SN.

Some examples of the method, apparatuses, and non-transitory computer-readable medium described herein may further include operations, features, means, or instructions for recovering the second SN from a first field of a header portion of the data packet, and recovering the offset from a second field of the header portion of the data packet.

Some examples of the method, apparatuses, and non-transitory computer-readable medium described herein may further include operations, features, means, or instructions for recovering the first SN from a header portion of the data packet.

Some examples of the method, apparatuses, and non-transitory computer-readable medium described herein may further include operations, features, means, or instructions for performing integrity verification on a data portion of the data packet using the first SN.

A method of wireless communication at a first device is described. The method may include associating, at a first protocol layer, a SN to a data packet for wireless transmission to a second device, determining that the SN includes a non-contiguous SN of a previous data packet for the wireless transmission, indicating an offset between the SN of the data packet and the previous data packet, and transmitting the data packet to a second protocol layer for wireless transmission to the second device, the second protocol layer being a lower layer than the first protocol layer.

An apparatus for wireless communication at a first device is described. The apparatus may include a processor and memory coupled to the processor. The processor and the memory may be configured to associate, at a first protocol layer, a SN to a data packet for wireless transmission to a second device, determine that the SN includes a non-contiguous SN of a previous data packet for the wireless transmission, indicate an offset between the SN of the data packet and the previous data packet, and transmit the data packet to a second protocol layer for wireless transmission to the second device, the second protocol layer being a lower layer than the first protocol layer.

Another apparatus for wireless communication at a first device is described. The apparatus may include means for associating, at a first protocol layer, a SN to a data packet for wireless transmission to a second device, determining that the SN includes a non-contiguous SN of a previous data packet for the wireless transmission, indicating an offset between the SN of the data packet and the previous data packet, and transmitting the data packet to a second protocol layer for wireless transmission to the second device, the second protocol layer being a lower layer than the first protocol layer.

A non-transitory computer-readable medium storing code for wireless communication at a first device is described. The code may include instructions executable by a processor to associate, at a first protocol layer, a SN to a data packet for wireless transmission to a second device, determine that the SN includes a non-contiguous SN of a previous data packet for the wireless transmission, indicate an offset between the SN of the data packet and the previous data packet, and transmit the data packet to a second protocol layer for wireless transmission to the second device, the second protocol layer being a lower layer than the first protocol layer.

Some examples of the method, apparatuses, and non-transitory computer-readable medium described herein may further include operations, features, means, or instructions for determining that a priority level associated with the data packet satisfies a threshold, where the offset may be indicated based on the priority level.

Some examples of the method, apparatuses, and non-transitory computer-readable medium described herein may further include operations, features, means, or instructions for determining that an expiry timer associated with a previously received data packet may have expired, where the offset may be indicated based on the expiry timer expiration.

In some examples of the method, apparatuses, and non-transitory computer-readable medium described herein, indicating the offset may include operations, features, means, or instructions for indicating the SN in a first field of a header portion of the data packet, and indicating the offset in an offset status report that may be transmitted separately from the data packet.

In some examples of the method, apparatuses, and non-transitory computer-readable medium described herein, indicating the offset may include operations, features, means, or instructions for indicating the SN in a first field of a header portion of the data packet, and indicating the offset in a second field of the header portion of the data packet.

In some examples of the method, apparatuses, and non-transitory computer-readable medium described herein, the second field includes one or more reserved fields of the header portion of the data packet.

In some examples of the method, apparatuses, and non-transitory computer-readable medium described herein, indicating the offset may include operations, features, means, or instructions for indicating an offset count field in the data packet, the offset count field including a number of offsets being indicated in the data packet.

Some examples of the method, apparatuses, and non-transitory computer-readable medium described herein may further include operations, features, means, or instructions for indicating, for each offset count field being indicated, an offset between the SN and a previous SN.

Some examples of the method, apparatuses, and non-transitory computer-readable medium described herein may further include operations, features, means, or instructions for performing integrity protection on a data portion of the data packet using the SN.

In some examples of the method, apparatuses, and non-transitory computer-readable medium described herein, the first protocol layer includes a PDCP layer.

A method of wireless communication at a first device is described. The method may include determining, at a first protocol layer, that a non-sequential condition exists for a SN of a data packet being wirelessly transmitted to a second device, indicating an offset between the SN and a sequential SN based on non-sequential condition, and transmitting the data packet to a second protocol layer for wireless transmission to the second device, the second protocol layer being a lower layer than the first protocol layer.

An apparatus for wireless communication at a first device is described. The apparatus may include a processor and memory coupled to the processor. The processor and the memory may be configured to determine, at a first protocol layer, that a non-sequential condition exists for a SN of a data packet being wirelessly transmitted to a second device, indicate an offset between the SN and a sequential SN based on non-sequential condition, and transmit the data packet to a second protocol layer for wireless transmission to the second device, the second protocol layer being a lower layer than the first protocol layer.

Another apparatus for wireless communication at a first device is described. The apparatus may include means for determining, at a first protocol layer, that a non-sequential condition exists for a SN of a data packet being wirelessly transmitted to a second device, indicating an offset between the SN and a sequential SN based on non-sequential condition, and transmitting the data packet to a second protocol layer for wireless transmission to the second device, the second protocol layer being a lower layer than the first protocol layer.

A non-transitory computer-readable medium storing code for wireless communication at a first device is described. The code may include instructions executable by a processor to determine, at a first protocol layer, that a non-sequential condition exists for a SN of a data packet being wirelessly transmitted to a second device, indicate an offset between the SN and a sequential SN based on non-sequential condition, and transmit the data packet to a second protocol layer for wireless transmission to the second device, the second protocol layer being a lower layer than the first protocol layer.

In some examples of the method, apparatuses, and non-transitory computer-readable medium described herein, determining that the non-sequential condition exists may include operations, features, means, or instructions for associating, at the first protocol layer, a first SN to a data packet as the SN to perform integrity protection on at least a portion of the data packet, and associating, at the first protocol layer, a second SN to the data packet for wireless transmission to the second device.

Some examples of the method, apparatuses, and non-transitory computer-readable medium described herein may further include operations, features, means, or instructions for determining that the second SN may be different from the first SN, where the indication of the offset may be based on the second SN being different from the first SN.

In some examples of the method, apparatuses, and non-transitory computer-readable medium described herein, indicating the offset may include operations, features, means, or instructions for indicating the second SN in a first field of a header portion of the data packet, and indicating the offset in a second field of the header portion of the data packet.

In some examples of the method, apparatuses, and non-transitory computer-readable medium described herein, determining that the non-sequential condition exists may include operations, features, means, or instructions for associating, at the first protocol layer, the SN to a data packet for wireless transmission to the second device, and determining that the SN includes a non-sequential SN for the wireless transmission.

In some examples of the method, apparatuses, and non-transitory computer-readable medium described herein, indicating the offset may include operations, features, means, or instructions for indicating the SN in a header portion of the data packet, and indicating the offset in a non-header portion of the data packet.

In some examples of the method, apparatuses, and non-transitory computer-readable medium described herein, indicating the offset may include operations, features, means, or instructions for indicating the SN in a first field of a header portion of the data packet, and indicating the offset in an offset status report that separate from the data packet.

In some examples of the method, apparatuses, and non-transitory computer-readable medium described herein, indicating the offset may include operations, features, means, or instructions for indicating the SN in a first field of a header portion of the data packet, and indicating the offset in a second field of the header portion of the data packet.

In some examples of the method, apparatuses, and non-transitory computer-readable medium described herein, the first protocol layer includes a PDCP layer.

A method of wireless communication at a second device is described. The method may include receiving an indication of a SN for a data packet and an offset between the SN and a contiguous SN, identifying the contiguous SN based on the indicated offset and the SN, performing integrity verification on the data packet according to the SN, and performing data packet ordering operations according to the contiguous SN.

An apparatus for wireless communication at a second device is described. The apparatus may include a processor and memory coupled to the processor. The processor and the memory may be configured to receive an indication of a SN for a data packet and an offset between the SN and a contiguous SN, identify the contiguous SN based on the indicated offset and the SN, perform integrity verification on the data packet according to the SN, and perform data packet ordering operations according to the contiguous SN.

Another apparatus for wireless communication at a second device is described. The apparatus may include means for receiving an indication of a SN for a data packet and an offset between the SN and a contiguous SN, identifying the contiguous SN based on the indicated offset and the SN, performing integrity verification on the data packet according to the SN, and performing data packet ordering operations according to the contiguous SN.

A non-transitory computer-readable medium storing code for wireless communication at a second device is described. The code may include instructions executable by a processor to receive an indication of a SN for a data packet and an offset between the SN and a contiguous SN, identify the contiguous SN based on the indicated offset and the SN, perform integrity verification on the data packet according to the SN, and perform data packet ordering operations according to the contiguous SN.

Some examples of the method, apparatuses, and non-transitory computer-readable medium described herein may further include operations, features, means, or instructions for recovering the SN from a header portion of the data packet, and recovering the offset from a non-header portion of the data packet.

Some examples of the method, apparatuses, and non-transitory computer-readable medium described herein may further include operations, features, means, or instructions for recovering the SN from a first field of a header portion of the data packet, and recovering the offset from an offset status report that may be received separately from the data packet.

Some examples of the method, apparatuses, and non-transitory computer-readable medium described herein may further include operations, features, means, or instructions for recovering the SN from a first field of a header portion of the data packet, and recovering the offset from a second field of the header portion of the data packet.

Some examples of the method, apparatuses, and non-transitory computer-readable medium described herein may further include operations, features, means, or instructions for recovering an offset count field in the data packet, the offset count field including a number of offsets being indicated in the data packet.

Some examples of the method, apparatuses, and non-transitory computer-readable medium described herein may further include operations, features, means, or instructions for identifying, for each offset count field being indicated, an offset between the SN and the previous SN.

DETAILED DESCRIPTION

Figure 1:
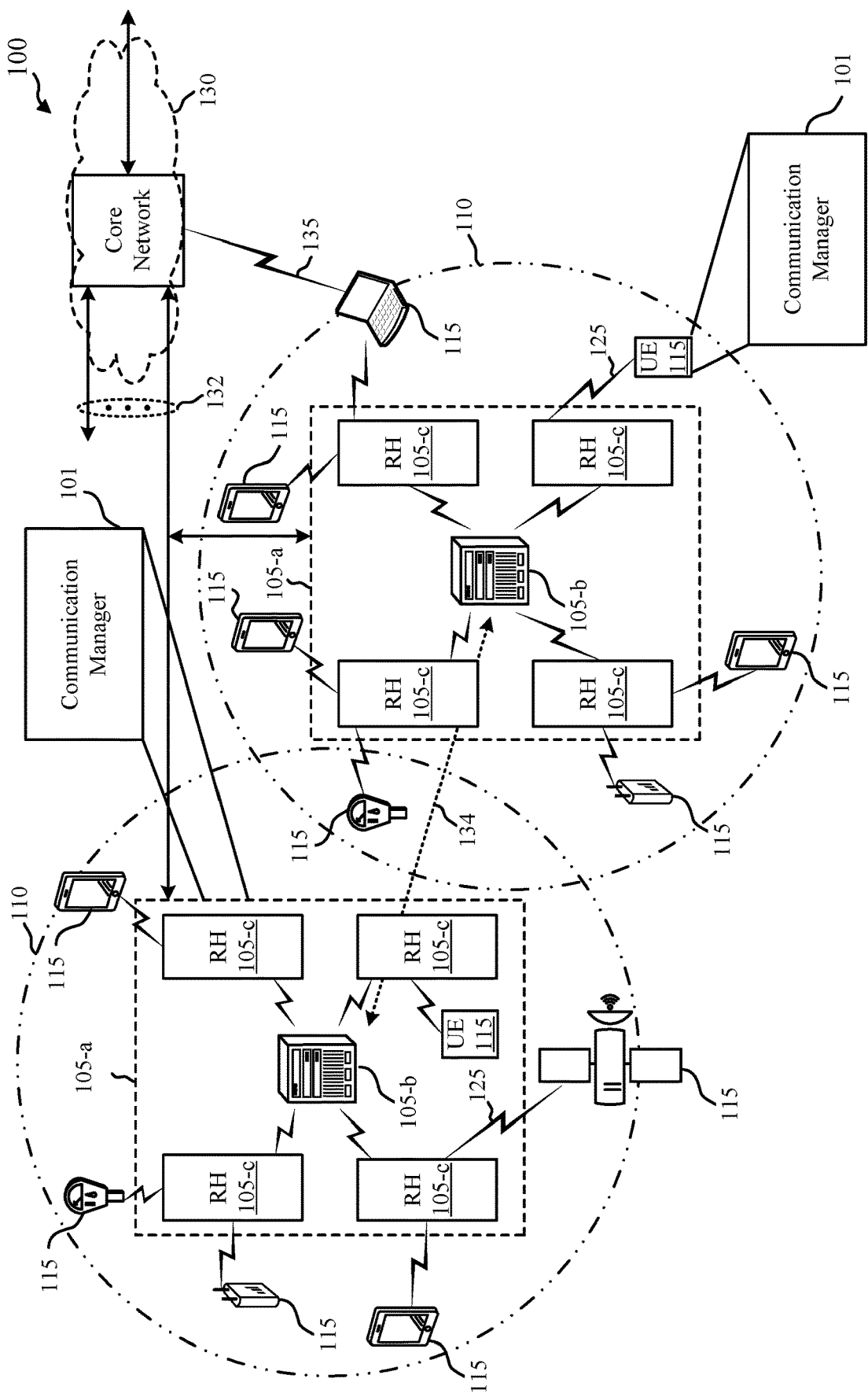
FIG. 1 illustrates an example of a system for wireless communications that supports integrity protection at PDCP layer, in accordance with one or more aspects of the present disclosure.

Wireless communications systems may utilize a protocol stack at each end (e.g., at a transmitting device and at a receiving device, which may be examples of a UE, a base station, a network device, and the like) of the wireless transmission. The protocol stack at each device may perform similar and/or complementary functions for their respective device, depending upon whether the device is the transmitting device or the receiving device. In some examples, the protocol stack may include three layers (e.g., layer 1 (L1), layer 2 (L2), and layer 3 (L3)), with each layer having one or more functions (or sublayers) that are designed to collectively package and communicate information over the wireless medium. One example layer includes the PDCP layer (a sublayer within L2, e.g., a first layer), which manages aspects of header compression and decompression of internet protocol (IP) data, transfer of data (for both the user plane and control plane data), maintenance of PDCP SNs, in-sequence delivery of upper layer PDUs, ciphering/de-ciphering, integrity protection, packet expiry timer-based discard, and the like. The PDCP layer may package the data packets and deliver them to lower layers (e.g., the radio link control (RLC) sublayer, medium access control (MAC) sublayer, and finally to the physical (PHY) layer) for wireless transmission.

Some techniques, however, may limit the throughput rate of data being communicated over the wireless network due to conflicting priorities and/or configurations. For example, integrity protection may be performed using a variety of different algorithms which output a message authentication code for integrity (MAC-I) field that is compared according to some inputs and added to the end of the PDU. Integrity protection may be performed on the data packet using a variety of inputs, e.g., keys, the transmission direction, the radio bearer identifier, and a count that is formed from the hyper-frame number (HFN) and the PDCP sequence number (SN). Integrity protection may be performed using a variety of different algorithms which outputs a message authentication code for integrity (MAC-I) field that is computed according to the inputs and added to the end of the PDU. However, this may create a problem since the PDCP SN may be used in integrity protection and, therefore, integrity protection can only be performed after assigning the PDCP SN. Some techniques may only support integrity protection being performed up to a maximum data rate, such as is declared by the UE in its UE capability configuration. However, this may create a problem because the PDCP SN is assigned just prior to transmission (e.g., when an uplink grant is received) rather than when the packet is received at the PDCP layer. The problem is that some packets may be sent out of order, e.g., due to expiration of an expiry timer associated with each packet, due to reception of a higher priority data packets, and the like. This may create holes (e.g., non-sequential or non-contiguous PDCP SNs) in the packet(s) that are actually communicated, which may result in processing delays by the receiving device. For example, some techniques at the PDCP layer of the receiving device may include a reordering timer that the receiving device must wait for its expiration before it can deliver out-of-sequence data packets to the upper layers. Accordingly, such techniques may limit the achievable throughput rate for wireless transmissions and/or a compromise security in the interest of high throughput.

Aspects of the disclosure are initially described in the context of a wireless communication system. The described techniques may provide mechanisms that improve integrity protection functions at the PDCP layer, as well as improve packet ordering/reordering operations at the receiving device. Aspects of the described techniques can be divided into a number of different approaches that may be utilized, alone or in any combination, to improve such operations. Aspects of the described techniques may provide for offset information to be communicated to the receiving device. The offset information may in some examples refer to a difference between sequential and non-sequential PDCP SNs (or non-contiguous PDCP SNs) and/or a difference between a pseudo-SN (e.g., a first SN) and a PDCP SN (e.g., a second SN). For example, at the PDCP layer (e.g., a first layer) of the transmitting device, it may be determined that a non-sequential condition (or non-contiguous condition) exists for a SN of the data packet being wirelessly transmitted to a receiving device. The non-sequential condition may be based on the PDCP layer utilizing a pseudo-SN that is assigned to the data packet for performing integrity protection functions and a regular PDCP SN that is assigned for wirelessly transmitting the packet. The non-sequential condition may be based on the PDCP layer utilizing non-sequential SNs for data packets being transmitted. The transmitting device may in some examples transmit or otherwise provide an indication of an offset (e.g., an indication of the difference between the pseudo-SN and the regular PDCP SN and/or an indication of the SN and a contiguous SN) to the receiving device.

The receiving device may in some examples receive the data packet and use the indicated offset and SN information to process the data packet. For example, the receiving device may use the offset and the SN used to transmit the data packet to identify the pseudo-SN used for integrity protection operations used by the transmitting device and/or use the offset and the SN during packet ordering/reordering operations. That is, the receiving device may perform integrity verification operations using the pseudo-SN (when used) or the SN used for wireless transmission. The receiving device may also perform packet reordering using the pseudo-SN (when used) or the SN used for the wireless transmission.

Aspects of the disclosure are further illustrated by and described with reference to apparatus diagrams, system diagrams, and flowcharts that relate to integrity protection at PDCP layer.

FIG. 1 illustrates an example of a wireless communications system 100 that supports elevation restriction beamforming in wireless systems, in accordance with one or more aspects of the present disclosure. The wireless communications system 100 includes network devices 105, UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, IP connectivity, and other access, routing, or mobility functions. At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or another interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (which may be known as a transmission/reception point (TRP); however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, for example in the range of 300 MHz to 300 GHz. The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a network device 105 or core network 130 supporting radio bearers for user plane data. At the PHY layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) network absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, cellular radio access technologies (RATs), such as mmW-based RATs, may be used to support access traffic between UEs 115 and network device 105, in addition to backhaul and access traffic among multiple network devices 105. Moreover, both access and backhaul traffic may share the same resources (e.g., as in the case of integrated access and backhaul (IAB)). Such wireless backhaul or IAB solutions may be increasingly beneficial with the evolution of cellular technologies due to enhancements in wireless link capacity and reduction in latency. Further, the use of wireless backhaul links may reduce the cost of dense small cell deployments. Thus, using a mmW RAT may enable wireless backhaul communication using one or more node functions at a wireless device, such as a network device 105, an access node, or UE 115.

In some aspects, UEs 115 and/or network devices 105 (when acting as a transmitting device) may include a communication manager 101, which may associate at a first protocol layer, a first sequence number to a data packet to perform integrity protection on at least a portion of the data packet. The communication manager 101 may associate at the first protocol layer, a second sequence number to the data packet for wireless transmission to a receiving device. The communication manager 101 may indicate an offset between the first sequence number and the second sequence number in the data packet. The communication manager 101 may transmit the data packet to a second protocol layer for wireless transmission to the receiving device, the second protocol layer being a lower layer than the first protocol layer.

In some aspects, UEs 115 and/or network devices 105 (when acting as a receiving device) may include the communication manager 101, which may receive a data packet from a transmitting device, the data packet indicating an offset between a first sequence number associated with the data packet to perform integrity verification and a second sequence number associated with the data packet for wireless transmission from the transmitting device. The communication manager 101 may identify the first sequence number based at least in part on the second sequence number and the indicated offset. The communication manager 101 may perform integrity verification on the data packet according to the first sequence number. The communication manager 101 may perform data packet ordering operations according to the second sequence number.

In some aspects, UEs 115 and/or network devices 105 (when acting as a transmitting device) may include a communication manager 101, which may associate, at a first protocol layer, a sequence number to a data packet for wireless transmission to a receiving device. The communication manager 101 may determine that the sequence number comprises a non-contiguous sequence number of a previous data packet for the wireless transmission. The communication manager 101 may indicate an offset between the sequence number of the data packet and the previous data packet. The communication manager 101 may transmit the data packet to a second protocol layer for wireless transmission to the receiving device, the second protocol layer being a lower layer than the first protocol layer.

In some aspects, UEs 115 and/or network devices 105 (when acting as a transmitting device) may include a communication manager 101, which may determine, at a first protocol layer, that a non-sequential condition exists for a sequence number of a data packet being wirelessly transmitted to a receiving device. The communication manager 101 may indicate an offset between the sequence number and a sequential sequence number based at least in part on non-sequential condition. The communication manager 101 may transmit the data packet to a second protocol layer for wireless transmission to the receiving device, the second protocol layer being a lower layer than the first protocol layer.

In some aspects, UEs 115 and/or network devices 105 (when acting as a receiving device) may include the communication manager 101, which may receive an indication of a sequence number for a data packet and an offset between the sequence number and a contiguous sequence number. The communication manager 101 may identify the contiguous sequence number based at least in part on the indicated offset and the sequence number. The communication manager 101 may perform integrity verification on the data packet according to the sequence number. The communication manager 101 may perform data packet ordering operations according to the contiguous sequence number.

Figure 2:
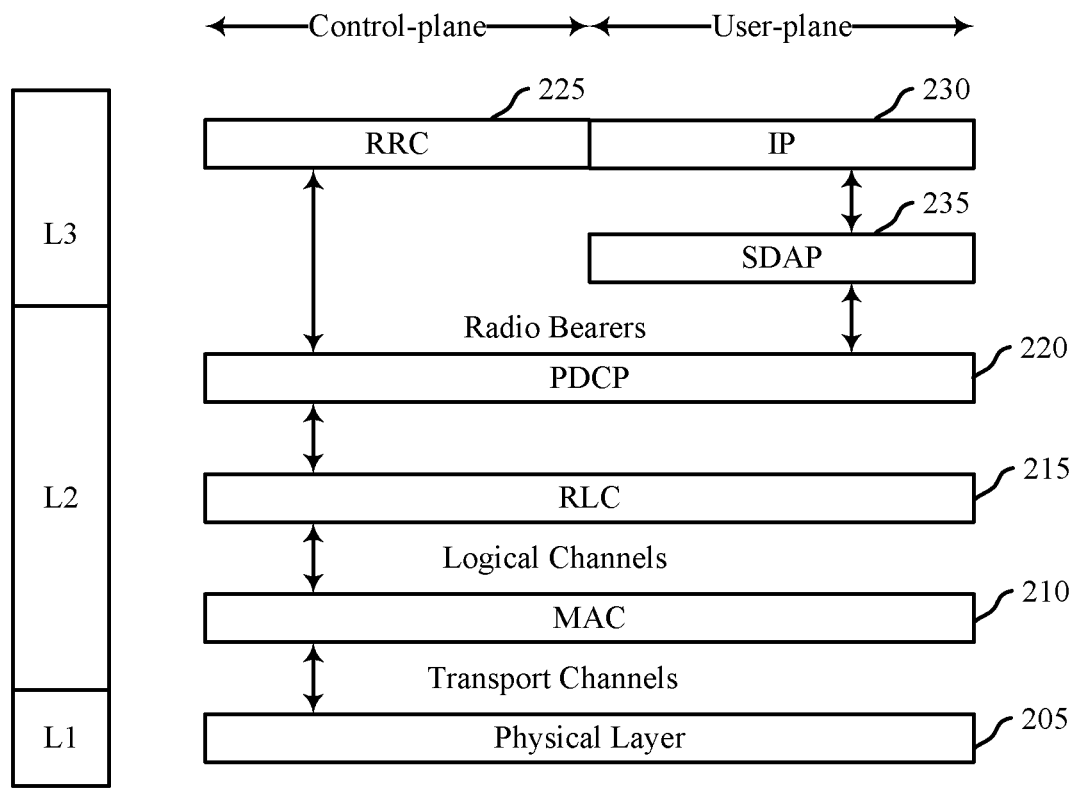
FIG. 2 illustrates an example of a protocol stack that supports integrity protection at PDCP layer, in accordance with one or more aspects of the present disclosure.

FIG. 2 illustrates an example of a protocol stack 200 that supports integrity protection at PDCP layer, in accordance with various aspects of the present disclosure. In some examples, protocol stack 200 may implement aspects of wireless communications system 100. Aspects of protocol stack 200 may be implemented by a base station, network device, and/or a UE, which may be examples of the corresponding transmitting and/or receiving devices described herein.

The protocol stack 200 for the UE and the network device (or base station) is shown with three layers: Layer 1, Layer 2, and Layer 3. L1 layer is the lowest layer and implements various physical layer signal processing functions. L1 may include the physical sublayer 205 which monitors, controls, or otherwise manages aspects of the wireless transmissions over the wireless medium. L2 layer is above the physical sublayer 205 (e.g., above L1) and is responsible for managing aspects of the wireless link between the UE and network device (or base station) over the physical sublayer 205.

L2 includes a MAC sublayer 210, a RLC sublayer 215, and a PDCP sublayer 220, which are terminated at the network device on the network side. There may be several upper layers above the L2 including a network layer (e.g., IP sublayer 230) that may be terminated at a PDN gateway on the network side, and an application layer that is terminated at the other end of the connection (e.g., far end UE, server, etc.).

The PDCP sublayer 220 provides multiplexing between different radio bearers and logical channels. The PDCP sublayer 220 also provides header compression for upper layer data packets to reduce radio transmission overhead, security by ciphering the data packets, and handover support for UEs between network devices. The PDCP sublayer 220 also manages integrity protection (on the transmitter side) and/or verification (on the receiver side), packet expiry timer operations, packet ordering/reordering operations, and the like. The RLC sublayer 215 provides segmentation and reassembly of upper layer data packets, retransmission of lost data packets, and reordering of data packets to compensate for out-of-order reception due to HARQ. The RLC sublayer 215 passes data to the MAC sublayer 210 as logical channels.

A logical channel may define what type of information is being transmitted over the air interface (e.g., user traffic, control channels, broadcast information, etc.). In some aspects, two or more logical channels may be combined into a logical channel group (LCG). By comparison, the transport channel defines how information is being transmitted over the air interface (e.g., encoding, interleaving, etc.) and the physical channel defines where information is being transmitted over the air interface (e.g., which symbols of the slot, subframe, fame, etc., are carrying the information).

In the control plane, the radio protocol architecture for the UE and network device is substantially the same for the physical sublayer 205 and the L2 with the exception that there is no header compression function for the control plane. The control plane also includes a RRC sublayer 225 in L3. The RRC sublayer 225 is responsible for obtaining radio resources (i.e., radio bearers) and for configuring the lower layers using RRC signaling between the network device and the UE.

In some examples, protocol stack 200 may also include a service data adaptation protocol (SDAP) sublayer 235 between the IP sublayer 230 and the PDCP sublayer 220. The SDAP sublayer 235 may perform functions such as mapping between QoS flow and DRB, marking QoS flow ID in both downlink and uplink packets, and the like. In some aspects, a single protocol entity for SDAP sublayer 235 may be configured for each individual PDU session, except for dual-connectivity configuration where two entities can be configured. As discussed, the PDCP sublayer 220 may manage aspects of integrity protection and/or packet ordering for wireless transmissions. For example, the PDCP sublayer 220 may assign PDCP SNs to packets received from higher layers (e.g., IP sublayer 230). In some examples, the assigned PDCP SN may be added to the data packet (e.g., in the packet header) and used during wireless transmission. The receiving device receives data packets and uses the PDCP SN indicated in the packet header for packet ordering, e.g., to order the received data packets for delivery to higher layers (e.g., the IP sublayer 230). However, in some situations the data packets may be communicated out of order. For example, the PDCP sublayer 220 may receive packet(s) from higher layers and assign the PDCP SN(s) to the packet(s). However, the PDCP sublayer 220 may then receive additional packets that have a higher priority level than the previously received data packets. Accordingly, the PDCP sublayer 220 (or the transmitting device) may transmit the higher priority packets before the previously received packets, thus a non-sequential or non-contiguous condition may occur when packets are wirelessly transmitted such that the PDCP SNs are non-sequential or otherwise non-contiguous. In another example, the PDCP sublayer 220 may receive packet(s) and start a packet expiry timer for each packet. The timer may be set to a value corresponding to how long the PDCP sublayer 220 (or the transmitting device) has to communicate the packet. When the expiry timer expires before packet(s) are communicated, the PDCP sublayer 220 may drop or discard the packet, thus creating another non-sequential or non-contiguous condition where packets are communicated with gaps or holes in the PDCP SNs.

On the receive side, the PDCP sublayer 220 of the receiving device may also start a reordering timer for each packet not received in-sequence. The reordering timer at the receiving device allows for the receiving device to finish processing the packets at lower layers in order to deliver sequential packets to upper layers. When there are holes, this results in the receiving device waiting for the reordering timer to expire before delivering the packets upstream, thus introducing delays and reduced throughput for the wireless transmissions.

Another issue associated with some techniques involves integrity protection/verification. At the transmitting device, the PDCP SN is in some examples assigned when a grant is received for communicating the packet. The transmitting device assigns the PDCP SN and uses it as an input to the integrity protection algorithm (e.g., to generate the MAC-I) that is then added to the packet before wireless transmission. However, this approach may result in additional processing delays at the transmitting device as the integrity protection functions are not performed until after the PDCP SN is assigned. Again, this may introduce delays and reduce achievable throughput of the wireless network.

However, aspects of the described techniques provide improved mechanisms to address such problems (and others) to improve wireless transmissions between the transmitting device and the receiving device. Aspects of the described techniques may be used individually and/or may be combined in any manner to achieve such improvements. In some examples, the described techniques provide for introduction of a pseudo-SN (a first sequence number) to be assigned or otherwise associated with a data packet in addition to the traditional PDCP SN (a second sequence number) and/or provide a mechanism for indicating offset information to the receiving device in the data packet (and/or in a separate PDCP status report communicated to the receiving device). That is, as PDCP SN is used for both integrity protection and/or ordering/reordering functions, aspects of the described techniques de-couple the two procedures to allow for integrity protection (and ciphering) to be performed earlier in the process. In some aspects, this may include using the traditional PDCP SN (the second sequence number) for ordering/reordering operations and defining a separate SN (e.g., the pseudo-SN or first sequence number) that can be used for integrity protection/ciphering. The separate SN may be based, at least in some aspects, on the traditional PDCP SN with minor changes. In other aspects, this may include keeping the traditional PDCP SN for integrity protection/ciphering and defining a separate sequence space (offset indication) to be used for reordering. This may also be based on the traditional PDCP SN with minor changes.

At the transmitting device, this may include assigning or otherwise associating the pseudo-SN (e.g., a first sequence number) to the data packet for integrity protection and a PDCP SN (e.g., a second sequence number) to the data packet for wireless transmission. The transmitting device may perform integrity protection on the data packet using the pseudo-SN and then assign the PDCP SN to the data packet for wireless transmission. The transmitting device may indicate in the data packet the PSCP SN (e.g., the second sequence number) and offset information. The offset may in some examples refer to the offset or difference between the pseudo-SN and the PDCP SN, e.g., the difference between the first sequence number and the second sequence number. The transmitting device (e.g., or rather the PDCP sublayer 220 of the transmitting device) may provide the data packet carrying or otherwise conveying the indication of the PDCP SN and the offset to lower layers for wireless transmission to a receiving device. The receiving device receives the data packet and uses the indicated offset and PDCP SN (e.g., the second sequence number) to identify the pseudo-SN (e.g., the first sequence number). The receiving device uses the pseudo-SN to perform integrity verification of the data packet and uses the PDCP SN to perform packet ordering operations.

In some aspects, this may include using the pseudo-SN to perform integrity protection rather than the real or traditional PDCP SN. The pseudo-SN may be the sequence number assigned temporarily to perform integrity protection and may be assigned when the data packet arrives at the PDCP sublayer 220, e.g., earlier in the process. The real or traditional PDCP SN (e.g., the second sequence number) may be used for reordering and assigned to the data packet (e.g., PDCP PDU) and added to the PDCP header when forming the PDU (e.g., closer to transmission). The real or traditional PDCP SN may be used by the receiving device for ordering/reordering operations. The offset between the pseudo-SN and the traditional PDCP SN may be added to a new PDCP header field for the receiver to perform integrity verification. In some aspects, the offset may equal or otherwise be based on a difference between the pseudo-SN and the traditional PDCP SN (e.g., offset=pseudo-SN−PDCP SN). At the receiver, the sequence number used for integrity verification may be based on the PDCP SN (as recovered from the PDCP header) plus the offset.

In some aspects, integrity protection may be performed on only a portion of the data packet. For example, integrity protection using the pseudo-SN may be performed on the PDCP SDU (e.g., the data portion of the packet, not including the PDCP header). This may support integrity protection being performed earlier in the process, thus increasing the achievable throughput when integrity protection is used. In some aspects, this may even remove the restriction on maximum data rate at which the integrity protection is supported. In some aspects, the pseudo-SN may also be used for ciphering, again moving the ciphering operations earlier into the process and improving achievable throughput. In some aspects, the offset information may be indicated in a header portion of the packet, as a new field within the packet (e.g., between the header and the data portion of the packet), and the like.

One example implementation of the described techniques may be in response data packet priority levels. For example, the transmitting device may use the pseudo-SN (e.g., the first sequence number) when a high priority packet arrives that must be transmitted before other packets. That is, the PDCP sublayer 220 may receive packets P1, P2, and P3 and assign pseudo-SNs 100, 101, and 102 (first sequence numbers for each of packets P1-P3), respectively, to the packets. Integrity protection may be performed on these packets using the assigned pseudo-SNs. Then, packet P4 may arrive at the PDCP sublayer 220 and have an associated priority level that is above a threshold, e.g., greater than the priority levels of packets P1-P3. The PDCP sublayer 220 may assign pseudo-SN 103 to packet P4 and perform integrity protection using the pseudo-SN 103. A grant may arrive (e.g., an uplink grant) that allocates resources for sending only some of the packets. Based on the priority level of packet P4, the PDCP sublayer 220 may determine that packets P4, P1, and P2 are to be wirelessly transmitted using the allocated resources. Accordingly, the PDCP sublayer 220 may assign packet P4 with a PDCP SN of 100 (the second sequence number) so that it is transmitted first, which results in an associated offset of three (e.g., offset (3)=pseudo-SN (103)−PDCP SN (100). PDCP sublayer 220 may assign packet P1 with a PDCP SN of 101, which results in an offset of −1 (e.g., −1=100−101). PDCP sublayer 220 may assign packet P2 with a PDCP SN of 102, which results in an offset of −1 (e.g., −1=101−102). At the receiving device, integrity verification may use the pseudo-SNs that are determined based on the PDCP SN and offset for each received data packet. As discussed, in some aspects the PDCP SN and the offset may be indicated in the data packet (e.g., in a header of the packet and/or in some other portion of the packet), e.g., using a bitmap or some other information. In some aspects, the pseudo-SN may be indicated in the packet, e.g., in the packet header. In this example, indicating the offset may including indicating the pseudo-SN.

Another example implementation of the described techniques may be in response expiration of a PDCP discard timer (e.g., an expiry timer associated with each packet). For example, the transmitting device may use the pseudo-SN (e.g., the first sequence number) when a previously received packets expire and are therefore discarded. That is, the PDCP sublayer 220 may receive packets P1, P2, P3, and P4 and assign pseudo-SNs 100, 101, 102, and 103 (first sequence numbers for each of packets P1-P4), respectively, to the packets. Integrity protection may be performed on these packets using the assigned pseudo-SNs. Then, the PDCP discard timer may expire for packets P1 and P2, which results in these packets being discarded. A grant may arrive (e.g., an uplink grant) that allocates resources for sending the packets and PDCP sublayer 220 may determine that packets P3 and P4 are to be wirelessly transmitted using the allocated resources. Accordingly, the PDCP sublayer 220 may assign packet P3 with a PDCP SN of 100 (the second sequence number), which results in an associated offset of two (e.g., offset (2)=pseudo-SN (102)−PDCP SN (100)). PDCP sublayer 220 may assign packet P4 with a PDCP SN of 101, which results in an offset of 2 (e.g., offset (2)=pseudo-SN (103)−PDCP SN (101)). At the receiving device, integrity verification may use the pseudo-SNs that are determined based on the PDCP SN and offset for each received data packet. Again, in some aspects the PDCP SN and the offset may be indicated in the data packet (e.g., in a header of the packet and/or in some other portion of the packet). In some aspects, the pseudo-SN may be indicated in the packet, e.g., in the packet header. In this example, indicating the offset may including indicating the pseudo-SN. Thus, aspects of the techniques described above utilize the pseudo-SN and offset indication to support improved integrity protection/ordering operations within the PDCP sublayer 220 of the transmitting device and/or the receiving device.

Additionally or alternatively, aspects of the described techniques provide a mechanism for improving ordering/reordering operations at the transmitting device and/or receiving device. In some aspects, this may include decoupling the PDCP SN from the ordering/reordering operations. For example, a transmitting device may associate or otherwise assign a PDCP SN (e.g., a sequence number in this context) to a data packet for wireless transmission to a receiving device. The transmitting device may determine that the PDCP SN is a non-contiguous sequence number (e.g., a non-sequential PDCP SN). The transmitting device may identify or otherwise determine the offset between the PDCP SN and a previous data packet (e.g., the offset between the PDCP SN and a PDCP SN previously assigned to a data packet). The transmitting device may configure the data packet to indicate the PDCP SN and, in some examples, the offset information. In other examples, the transmitting device may provide the offset information in a separate signal (e.g., a PDCP status report). The transmitting device may transmit the data packet to the wireless device (e.g., the PDCP sublayer 220 may transmit or otherwise provide the data packet to a lower layer for wireless transmission). The receiving device may receive the data packet and use the offset and the PDCP SN to identify the offset (e.g., the contiguous SN). The receiving device may use the PDCP SN for integrity verification and the contiguous SN for packet ordering operations.

In some aspects, this may include continuing to use the PDCP SN for integrity protection and/or ciphering operations. This may include allowing holes (e.g., offsets) in PDCP SN while transmitting. In some examples, the PDCP reordering at the receiving device may wait for the holes to be filled before continuing processing the packet. However, if the information about the holes (e.g., the offset information) is communicated to the receiving device, there is no need for the receiving device to wait for reordering. The information about the holes (e.g., the offset) may be indicated in the PDCP header and/or in a PDCP status report sent by the transmitting device. This may allow PDCP SN to be assigned earlier (e.g., before the grant is received) and ciphering and/or integrity protection functions to be performed, and yet continue to use the PDCP discard timer expiry and packet prioritization (e.g., transmission control protocol (TCP) ACK packet prioritization). In some aspects, integrity protection may be performed on the PDCP SDU portion of the packet (e.g., the data portion rather than the PDCP header). Again, this may allow integrity protection to be performed ahead of time.

In some aspects, a PDCP discard timer expiry may result in holes (e.g., offsets) in the PDCP SNs that are communicated to the receiving device. Utilizing the described techniques, such discards can be easily handled without reassigning PDCP SNs and without affecting packet reordering at the receiving device.

In some aspects, high priority packets (e.g., TCP ACK packets) may include the transmitting device deliberately inserting holes (e.g., offsets) while assigning PDCP SNs, e.g., leaving every other, third, or some other number of holes blank in anticipation of high priority packets arriving later. These holes can be used for TCP ACKs, for example, that arrive later (but before the SN(s) after the holes are transmitted). The transmitting device may determine if, or which, holes to leave based on current communication trends, expected communication trends, historical communication trends, and the like. If no priority packets arrive, then the holes (e.g., the indication of the offset) can be communicated to the receiving device. In some aspects, a learning mechanism may adaptively insert holes based on high priority packet frequency in the associated data flow.

Thus, one example implementation of the described techniques may be in response to data packet priority levels. For example, the transmitting device may receive packets P1, P2, and P3 and assign PDCP SNs 102, 103, and 104, respectively, to the packets (thus leaving holes at 100 and 101). Then, packet P4 may arrive at the PDCP sublayer 220 and have an associated priority level that is above a threshold, e.g., greater than the priority levels of packets P1-P3. The PDCP sublayer 220 may assign PDCP SN 100 to packet P4 (leaving a hole at 101). A grant may arrive (e.g., an uplink grant) that allocates resources for sending only some of the packets. Based on the priority level of packet P4, the PDCP sublayer 220 may determine that packets P4, P1, and P2 are to be wirelessly transmitted using the allocated resources. PDCP sublayer 220 may have different options on how to handle the packet from there. In a first option, the PDCP sublayer 220 may continue to use the assigned PDCP SN of 100 with packet P4, which results in an associated offset of zero. In this context, the PDCP SN would be considered the sequence number and the offset of zero may refer to the difference between the PDCP SN and the contiguous sequence number (e.g., the number of holes, which is zero for packet P4). The PDCP sublayer 220 may configured a number of holes bitmap in the packet to indicate zero (meaning that no hole is being indicated with respect to the PDCP SN 100 being communicated). And for a hole bitmap corresponding to the packet P4, the PDCP sublayer 220 may configure the bitmap to indicate that the offset is zero. The number of holes bitmap being indicated for packet P1 can be set to one, with the corresponding hole bitmap set as "00000001" to indicate that there is one hole between the current PDCP SN and the previously communicated PDCP SN in the transmission, e.g., the hole at PDCP SN 101. The PDCP sublayer 220 may use PDCP SN of 103 for packet P2, with the corresponding number of hole bitmap set as "00000000" to indicate that the offset is zero. In a second option, the PDCP sublayer 220 may use the PDCP SN of 100 for packet P4 and indicate an offset value of zero, use PDCP SN 102 for packet P1 with a corresponding offset value of one, and use PDCP SN 103 for packet P2 with a corresponding offset value of zero (as PDCP SN 103 immediately follows PDCP SN 102).

Another example implementation of the described techniques may be in response to expiration of a PDCP discard timer (e.g., an expiry timer associated with each packet). For example, the PDCP sublayer 220 may receive packets P1, P2, P3, and P4 and assign PDCP SNs 100, 101, 102, and 103. Then, the PDCP discard timer may expire for packets P1 and P2, which results in these packets being discarded. A grant may arrive (e.g., an uplink grant) that allocates resources for sending the packets and PDCP sublayer 220 may determine that packets P3 and P4 are to be wirelessly transmitted using the allocated resources. The PDCP sublayer 220 may have two options in how to indicate the offset. In a first option, the PDCP sublayer 220 may continue to use the assigned PDCP SN of 102 with packet P3, which results in an associated offset of two (e.g., two holes, PDCP SNs 100 and 101, are present with respect to packet P3). In this context, the PDCP SN would be considered the sequence number and the offset of two may refer to the difference between the PDCP SN and the contiguous sequence number (e.g., the number of holes with respect to contiguous PDCP SN 100). The PDCP sublayer 220 may configure a number of holes bitmap in the packet to indicate one (meaning that only one hole is being indicated with respect to the PDCP SNs being communicated). And for a hole bitmap corresponding to the packet P3, the PDCP sublayer 220 may configure the bitmap as "00000011" to indicate that the offset is two. The number of holes bitmap being indicated for packet P4 can be set to zero, with no corresponding hole bitmap (as the PDCP SN of 104 for packet P4 is sequential from the perspective of the PDCP SN of 103 of packet P3 that was communicated using the allocated resources). In a second option, the PDCP sublayer 220 may use the PDCP SN of 103 for packet P3 and indicate an offset value of two. The PDCP sublayer 220 may use the PDCP SN of 104 for packet P4 and indicate an offset value of zero.

Figure 3:
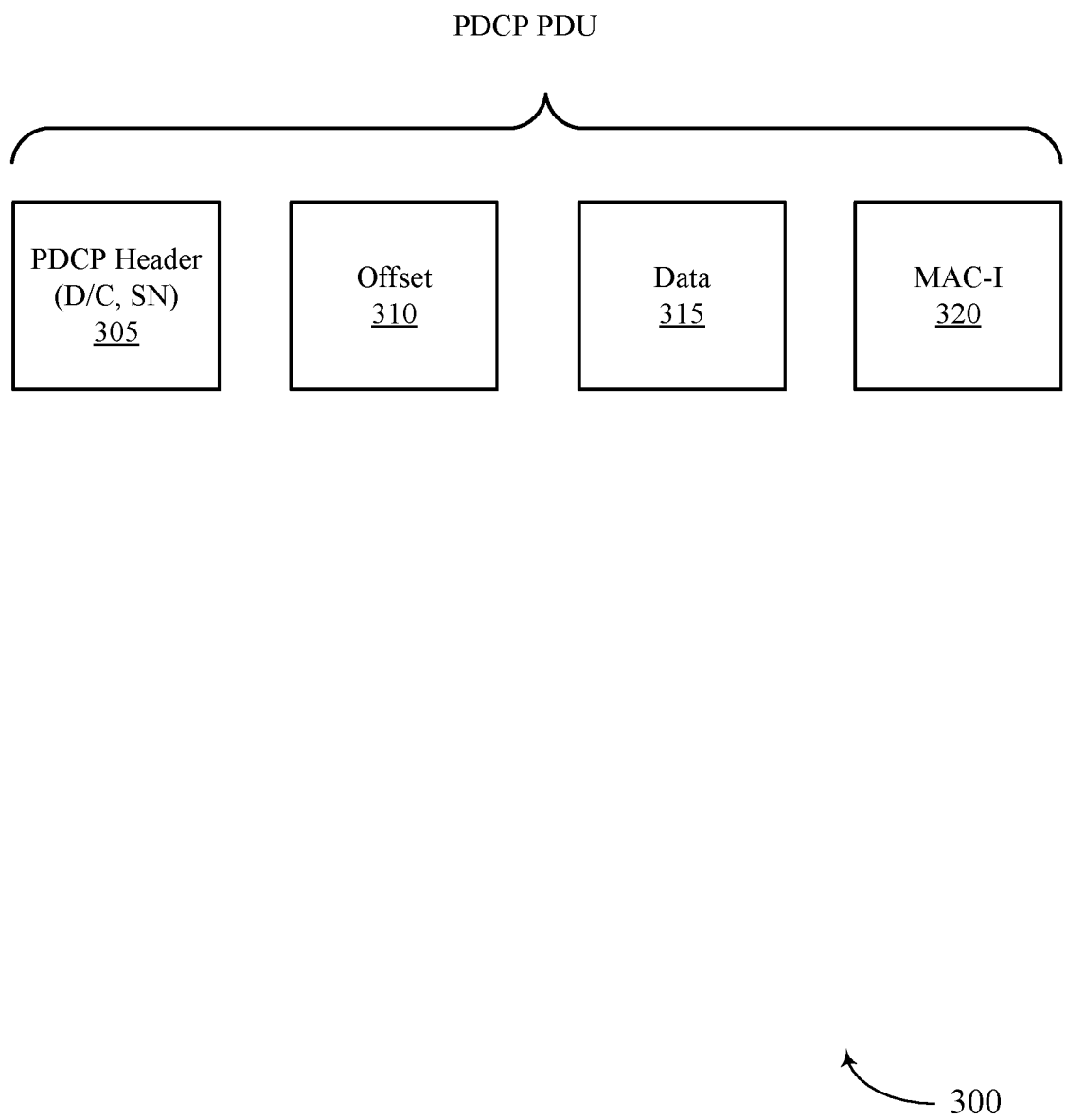
FIG. 3 illustrates an example of a PDCP protocol data unit (PDU) that supports integrity protection at PDCP layer, in accordance with one or more aspects of the present disclosure.

FIG. 3 illustrates an example of a PDCP PDU 300 that supports integrity protection at PDCP layer, in accordance with various aspects of the present disclosure. In some examples, PDCP PDU 300 may implement aspects of wireless communication system 100 and/or protocol stack 200. Aspects of PDCP PDU 300 may be implemented by a transmitting device and/or a receiving device, which may be examples of a UE, base station, network device, and the like, as is described herein. In some aspects, PDCP PDU 300 is one example format for a data packet being wirelessly transmitted.

As discussed, aspects of the described techniques may include indicating an offset from a transmitting device to a receiving device. In some aspects, the offset information may be based on a difference between a first sequence number (e.g., a pseudo-SN) and a second sequence number (e.g., a PDCP SN). In some aspects, the offset information may be based on a difference between a PDCP SN and a contiguous sequence number (e.g., an indication of the number of hole(s) or non-sequential PDCP SNs). PDCP PDU 300 may illustrate one example of how the offset information can be indicated.

The PDCP layer (such as PDCP sublayer 220 of FIG. 2) may provide a data packet to a second layer (e.g., a lower layer) for wireless transmission to a receiving device. In some aspects, a non-sequential condition may exist for the data packet, e.g., based on the offset discussed above. Accordingly, PDCP PDU 300 illustrates one example of how the transmitting device may indicate the offset to the receiving device.

The data packet output by the PDCP layer (e.g., the first layer) may include a PDCP header 305, an offset 310, a data portion 315, and a MAC-I indication 320. The PDCP header 305 may include a data/control (D/C) indication (e.g., an indication of the type of packet), one or more reserved fields, and the PDCP SN assigned to the packet (the second sequence number in some of the described techniques). The offset 310 may in some examples be considered a non-header portion of the data packet and may carry or otherwise convey an indication of the offset information associated with the packet. For example, the offset 310 may indicate a difference between a pseudo-SN and the PDCP SN. As another example, the offset 310 may indicate the number of holes with respect to the PDCP SN of the current packet and a previous packet communicated in the transmission. The data portion 315 may in some examples carry the data being communicated and the MAC-I may carry or convey the integrity protection value generated for the packet.

Figure 4:
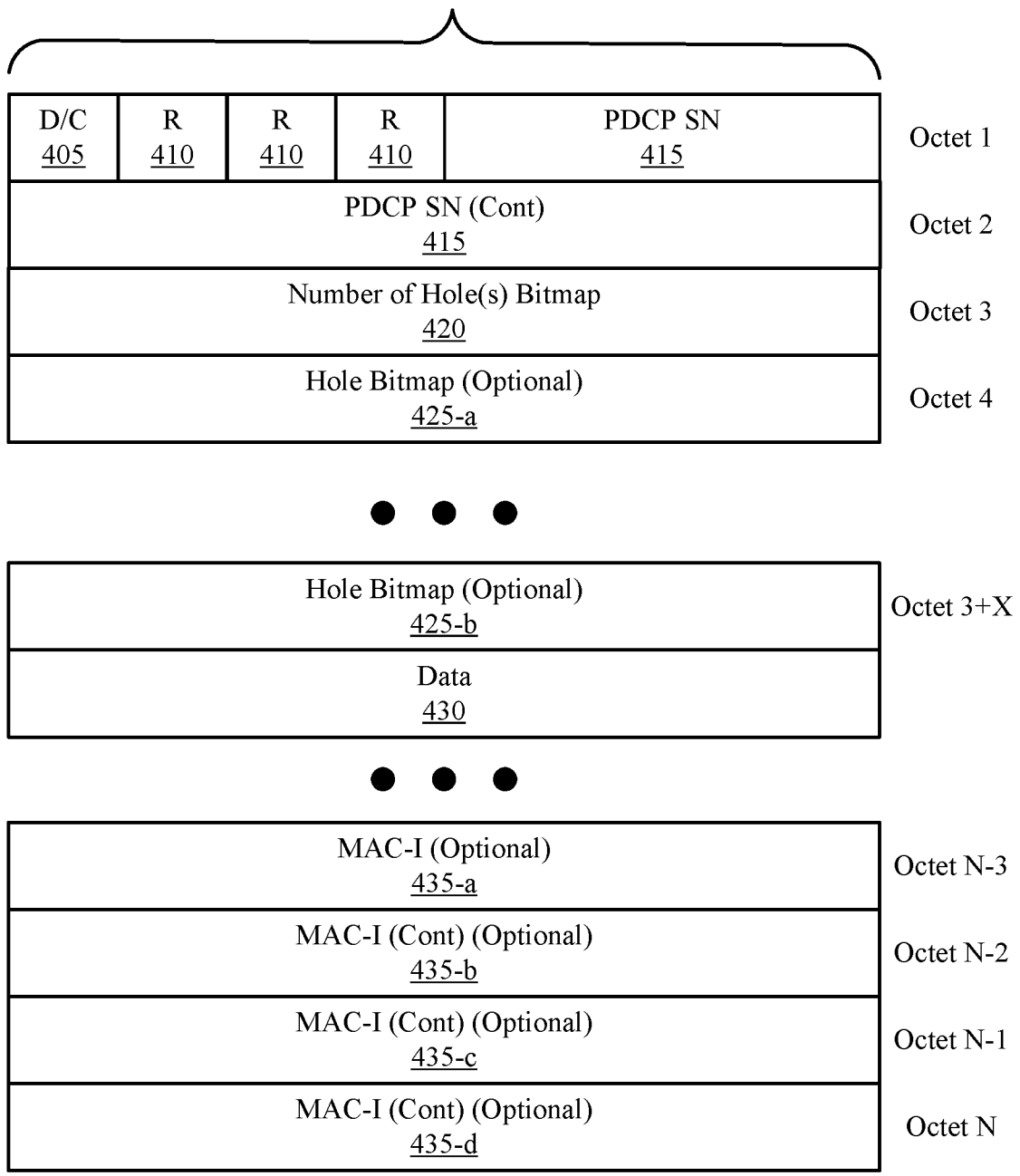
FIG. 4 illustrates an example of a PDCP PDU that supports integrity protection at PDCP layer, in accordance with one or more aspects of the present disclosure.

FIG. 4 illustrates an example of a PDCP PDU 400 that supports integrity protection at PDCP layer, in accordance with various aspects of the present disclosure. In some examples, PDCP PDU 400 may implement aspects of wireless communication system 100 and/or protocol stack 200. Aspects of PDCP PDU 400 may be implemented by a transmitting device and/or a receiving device, which may be examples of a UE, base station, network device, and the like, as is described herein.

As discussed, aspects of the described techniques may include indicating an offset from a transmitting device to a receiving device. In some aspects, the offset information may be based on a difference between a first sequence number (e.g., a pseudo-SN) and a second sequence number (e.g., a PDCP SN). In some aspects, the offset information may be based on a difference between a PDCP SN and a contiguous sequence number (e.g., an indication of the number of hole(s) or non-sequential PDCP SNs). PDCP PDU 400 illustrates one example of how the offset information can be indicated using the number of holes bitmap (e.g., an offset count field) and the holes bitmap (e.g., an offset between the sequence number and a previous sequence number) technique.

The PDCP layer (such as PDCP sublayer 220 of FIG. 2) may provide a data packet to a second layer (e.g., a lower layer) for wireless transmission to a receiving device. In some aspects, a non-sequential or non-contiguous condition may exist for the data packet, e.g., based on the offset discussed above. Accordingly, PDCP PDU 400 illustrates one example of how the transmitting device may indicate the offset to the receiving device.

The data packet output by the PDCP layer (e.g., the first layer) may include a plurality of octets, with N octets being shown by way of example only. In some aspects, the first octet may include direction bit 405 that indicates the transmit direction of the packet, a number of reserved bits 410 (with three being shown by way of example only), and a PDCP SN field 415 which carries or conveys the indication of the PDCP SN (which may also be considered the second sequence number in some examples). The PDCP SN field 415 may continue into the second octet. The third octet may carry the number of holes bitmap 420 that may represent a number of bytes that follow that represent the bitmap of holes (e.g., the offset) before the PDCP SN indicated in the PDCP SN field 415. A corresponding hole bitmap 425 may be indicated in the fourth octet, with the number of hole bitmaps 425 being dependent upon the value indicated in the number of holes bitmap 420 (with hole bitmaps 425-*a* and 425-*b* being shown by way of example only). The number of holes bitmap 420 may include the bit position 1 as the least significant bit in the first hole bitmap (e.g., corresponds to hole bitmap 425-*a*), with the second bit position corresponding to the hole bitmap 425-*b*. Each bit may indicate whether there is a hole (e.g., offset) corresponding to the PDCP SN bit position.

The PDCP PDU 400 may continue with one or more data fields 430 (the number being dependent upon the size of the data packet) and optional MAC-I fields 435 (with four being shown by way of example only). Accordingly, PDCP PDU 400 illustrates one example of how a transmitting device may indicate an offset between a sequence number of the data packet and a previous data packet. Communicating the offset information (e.g., the hole count) to the receiving device may improve ordering operations at the receiving device and increase throughput.

Figure 5:
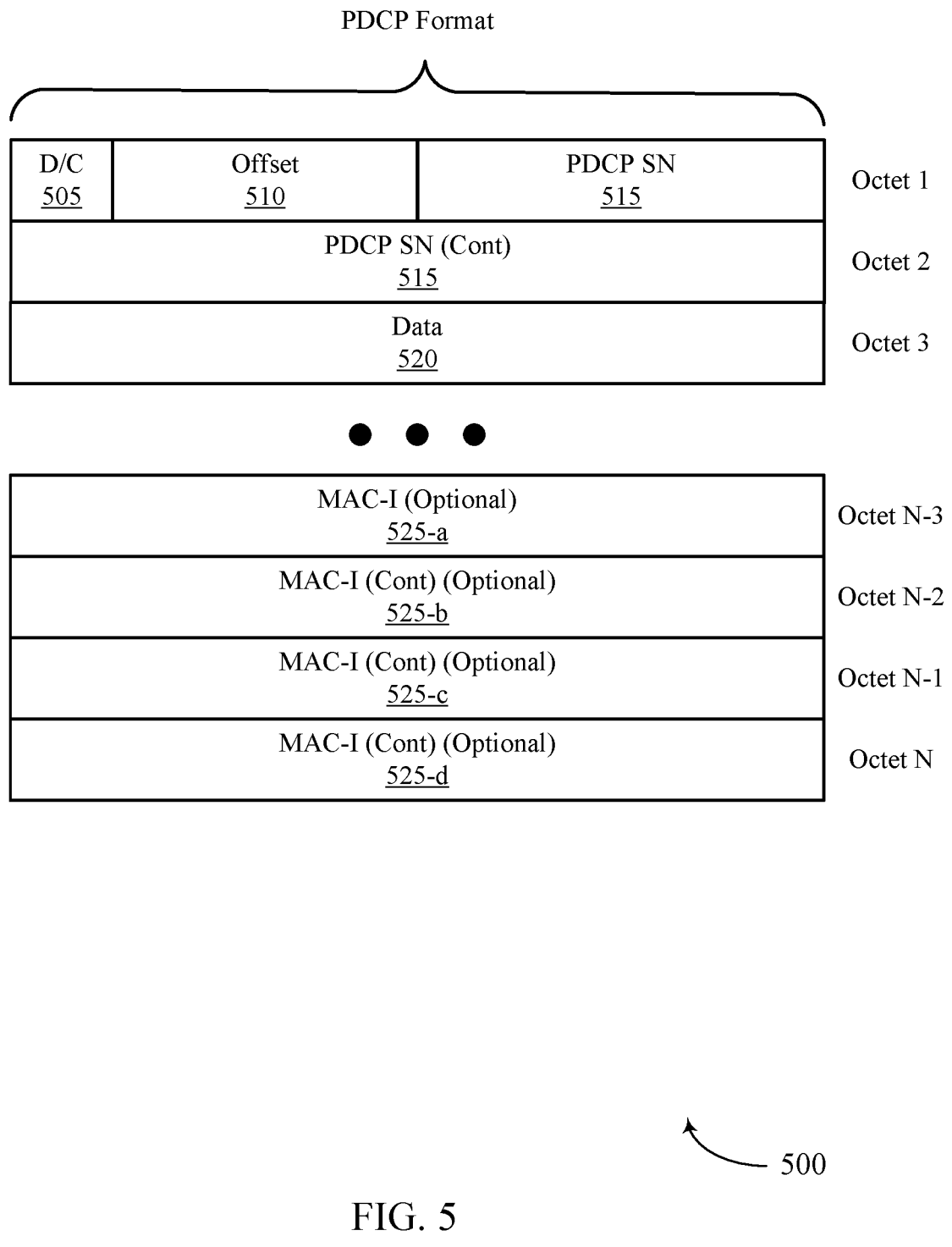
FIG. 5 illustrates an example of a PDCP PDU that supports integrity protection at PDCP layer, in accordance with one or more aspects of the present disclosure.

FIG. 5 illustrates an example of a PDCP PDU 500 that supports integrity protection at PDCP layer, in accordance with various aspects of the present disclosure. In some examples, PDCP PDU 500 may implement aspects of wireless communication system 100 and/or protocol stack 200. Aspects of PDCP PDU 500 may be implemented by a transmitting device and/or a receiving device, which may be examples of a UE, base station, network device, and the like, as is described herein.

As discussed, aspects of the described techniques may include indicating an offset from a transmitting device to a receiving device. In some aspects, the offset information may be based on a difference between a first sequence number (e.g., a pseudo-SN) and a second sequence number (e.g., a PDCP SN). In some aspects, the offset information may be based on a difference between a PDCP SN and a contiguous sequence number (e.g., an indication of the number of hole(s) or non-sequential PDCP SNs). PDCP PDU 500 may illustrate one example of how the offset information can be indicated in the header portion of the data packet.

The PDCP layer (such as PDCP sublayer 220 of FIG. 2) may provide a data packet to a second layer (e.g., a lower layer) for wireless transmission to a receiving device. In some aspects, a non-sequential or non-contiguous condition may exist for the data packet, e.g., based on the offset discussed above. Accordingly, PDCP PDU 500 illustrates one example of how the transmitting device may indicate the offset to the receiving device.

The data packet output by the PDCP layer (e.g., the first layer) may include a plurality of octets, with N octets being shown by way of example only. In some aspects, the first octet may include direction bit 505 that indicates the transmit direction of the packet (or PDCP PDU), an offset field 510 that carries or conveys the indication of the offset (e.g., the usize of the PDCP hole), and a PDCP SN field 515 which carries or conveys the indication of the PDCP SN (which may also be considered the second sequence number in some examples). In some aspects, the information carried or conveyed in the offset field 510 may be used by the receiving device to perform reordering, e.g., missing PDCP PDUs are in a range PDCP SN−offset, . . . , PDCP SN−1). These missing PDCP PDUs may be ignored at the receiving side.

In some aspects, PDCP PDU 500 may be considered backwards compatible by using reserved bits in the PDCP header. This may include using the reserved bits to indicate a new field (e.g., the offset) to indicate the size of the hole in PDCP SNs. In some aspects, three reserved bits may be used in PDCP format for a 12 bit PDCP SN and five reserved bits may be used in PDCP format for an 18 bit PDCP SN. This could potentially restrict the size of holes ($2^3-1$) or ($2^5-1$) based on the configured PDCP SN length for the data radio bearer. A receiver capable of understanding the new format (e.g., the offset field 510) may correctly interpret the holes and move its reordering window accordingly. A legacy receiving device will ignore these bits and may end up waiting until the end of a reordering timer.

The PDCP PDU 500 may continue with the PDCP SN field 515 being continued into the second octet. The PDCP PDU 500 may continue with one or more data fields 520 (the number being dependent upon the size of the data packet) and optional MAC-I fields 525 (with four being shown by way of example only). Accordingly, PDCP PDU 500 illustrates one example of how a transmitting device may indicate an offset between sequence numbers of the data packet and a previous data packet. Communicating the offset information (e.g., the hole count) to the receiving device may improve ordering operations at the receiving device and increase throughput.

Figure 6:
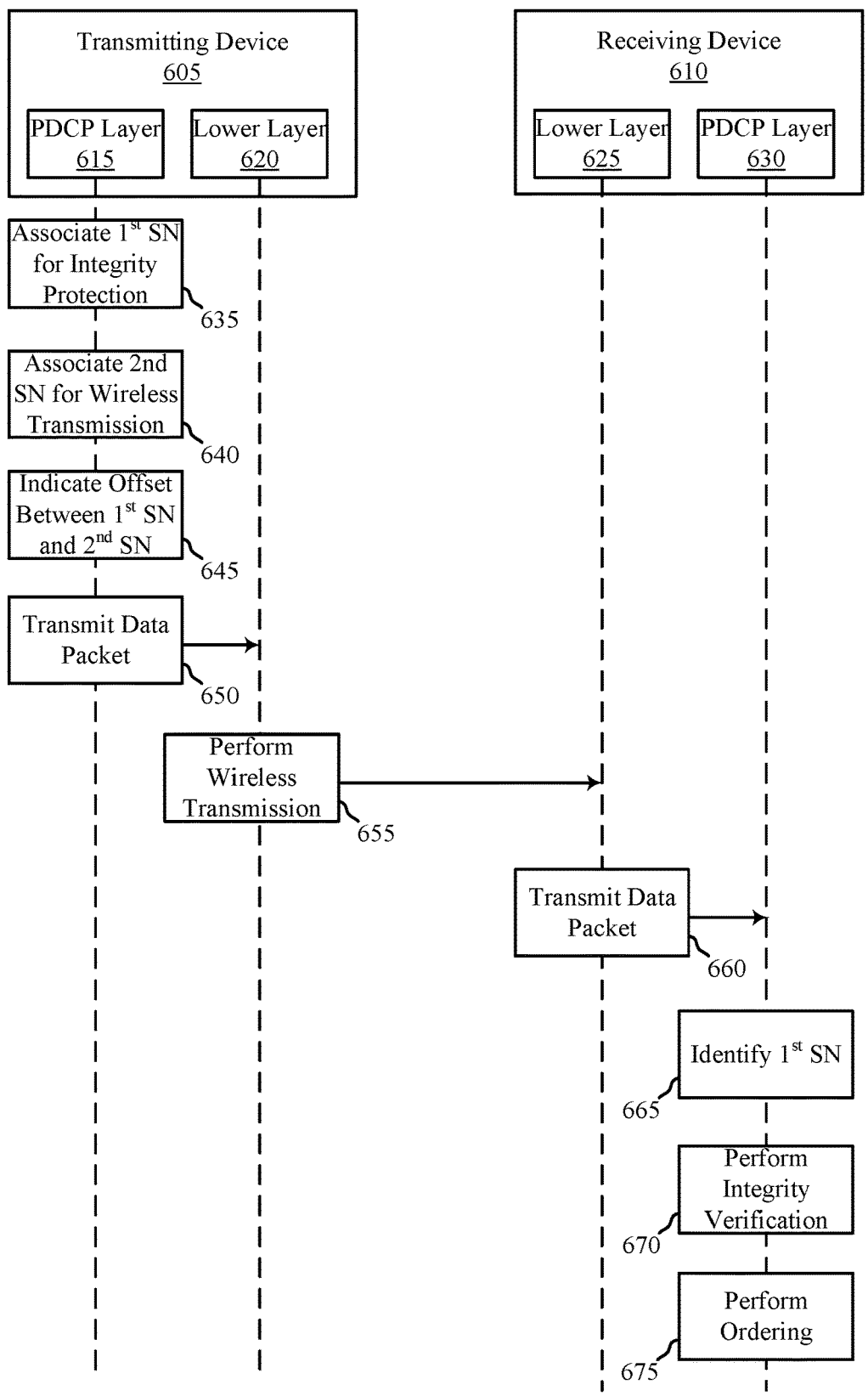
FIG. 6 illustrates an example of a process that supports integrity protection at PDCP layer, in accordance with one or more aspects of the present disclosure.

FIG. 6 illustrates an example of a process 600 that supports integrity protection at PDCP layer, in accordance with various aspects of the present disclosure. In some examples, process 600 may implement aspects of wireless communication system 100, protocol stack 200, and/or PDCP PDUs 300, 400, 500. Aspects of process 600 may be implemented by a transmitting device 605 and/or a receiving device 610, which may be examples of a UE, base station, network device, and the like, as is described herein.

In some aspects, the transmitting device 605 may include a PDCP layer 615 and a lower layer 620, with the lower layer 620 being an example of a physical layer or another sublayer that is lower than the PDCP layer 615 within L2. Similarly, receiving device 610 may include a lower layer 625 and the PDCP layer 630, with the lower layer 625 being an example of a physical layer or another sublayer that is lower than the PDCP layer 630 within L2.

At 635, PDCP layer 615 (e.g., a first protocol layer) of transmitting device 605 may associate or otherwise assign a first sequence number to a data packet to perform integrity protection on at least a portion of the data packet. In some aspects, the first sequence number may be a pseudo-SN.

At 640, PDCP layer 615 of transmitting device 605 may associate or otherwise assign a second sequence number to the data packet for wireless transmission to a receiving device 610. In some aspects, the second sequence number may be a PDCP SN.

In some aspects, this may include determining that a priority level associated with the data packet satisfies a threshold (e.g., the data packet has a higher priority than previously received data packets), with the second sequence number being assigned to the data packet based on the priority level. For example, the data packet may have a higher associated priority level such that its transmission is prioritized over other data packets available for transmission.

In some aspects, this may include determining that an expiry timer associated with the previously received data packet has expired. For example, one or more previously received data packets may be discarded upon expiration of the expiry timer, leaving holes in the PDCP SNs. Accordingly, the second sequence number may be assigned to the data packet based on the expiry timer expiration.

At 645, PDCP layer 615 of transmitting device 605 may indicate an offset between the first sequence number and the second sequence number in the data packet. In some aspects, this may include determining that the second sequence number is different from the first sequence number. The indication of the offset may be based on this determination that the second sequence number is different from the first sequence number.

In some aspects, this may include indicating the second sequence number in a first field of a header portion of the data packet and indicating the offset in a second field of the header portion of the data packet. In some aspects, this may include indicating the first sequence number in a header portion of the data packet as well.

At 650, PDCP layer 615 may transmit or otherwise provide the data packet to lower layer 620 (e.g., a second protocol layer that is lower than the PDCP layer 615) for wireless transmission to a receiving device's 610. At 655, lower layer 620 of transmitting device 605 may perform the wireless transmission of the data packet to receiving device 610, which may receive the data packet from transmitting device 605.

At 660, lower layer 625 of receiving device 610 may transmit or otherwise provide the data packet to PDCP layer 630 for further processing.

At 665, PDCP layer 630 of receiving device 610 may identify the first sequence number based at least in part on the second sequence number and the indicated offset. In some aspects, this may include recovering the second sequence number from a first field in a header portion of the data packet and recovering the offset in a second field of the header portion of the data packet. In some aspects, this may include recovering the first sequence number from the header portion of the data packet.

At 670, the PDCP layer 630 of receiving device 610 may perform integrity verification on the data packet using the first sequence number. In some aspects, this may include performing integrity verification on a data portion of the data packet using the first sequence number.

At 675, the PDCP layer 630 and a receiving device 610 may perform data packet ordering operations using the second sequence number, e.g., before passing the data packet to upper layers for further processing.

Figure 7:
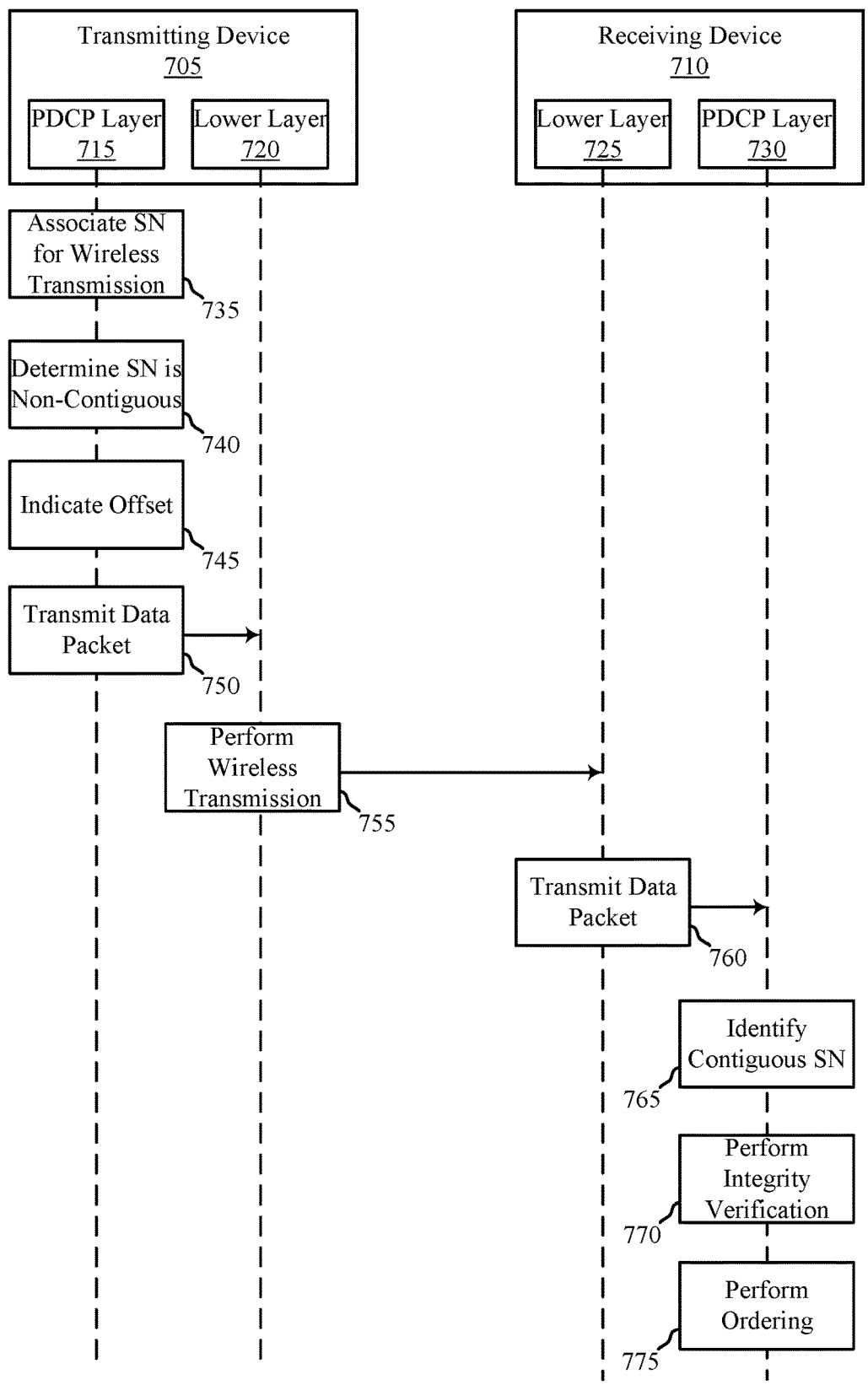
FIG. 7 illustrates an example of a process that supports integrity protection at PDCP layer, in accordance with one or more aspects of the present disclosure.

FIG. 7 illustrates an example of a process 700 that supports integrity protection at PDCP layer, in accordance with various aspects of the present disclosure. In some examples, process 700 may implement aspects of wireless communication system 100, protocol stack 200, and/or PDCP PDUs 300, 400, 500. Aspects of process 700 may be implemented by a transmitting device 705 and/or a receiving device 710, which may be examples of a UE, base station, network device, and the like, as is described herein.

In some aspects, the transmitting device 705 may include a PDCP layer 715 and a lower layer 720, with the lower layer 720 being an example of a physical layer or another sublayer that is lower than the PDCP layer 715 within L2. Similarly, receiving device 710 may include a lower layer 725 and a PDCP layer 730, with the lower layer 725 being an example of a physical layer or another sublayer that is lower than the PDCP layer 730 within L2.

At 735, the PDCP layer 715 of transmitting device 705 may associate or otherwise assign a sequence number (e.g., a PDCP SN) to a data packet for wireless transmission to a receiving device.

In 740, the PDCP layer 715 transmitting device 705 may identify or otherwise determine that the sequence number is a non-contiguous sequence number of a previous data packet for the wireless transmission. For example, this may include determining that there are holes in the PDCP SNs.

In some aspects, this may include determining that a non-sequential condition exists for a sequence number of the data packet being wirelessly transmitted to receiving device 710.

At 745, the PDCP layer 715 of transmitting device 705 may indicate an offset between a sequence number of the data packet and the previous data packet, e.g., indicate the offset between the PDCP SN of the current data packet and the PDCP SN of a previous data packet. In some aspects, this may be based on the determination that a priority level associated with the data packet satisfies a threshold, with the offset being indicated based at least in part on the priority level. In some aspects, this may be based on a determination that an expiry timer associated with the previously received data packet has expired, with the offset being indicated based at least in part on the expiration of the expiry timer.

In some aspects, this may include indicating the sequence number in a first field of a header portion of the data packet and indicating the offset in an offset status report that is transmitted separately from the data packet. In some aspects, this may include indicating the sequence number and a first field of the header portion of the data packet and indicating the offset in a second field of the header portion of the data packet. In some examples, the second field of the header portion of the data packet may include one or more reserved bits or fields of the header portion of the data packet.

In some aspects, this may include indicating an offset count field in the data packet, with the offset count field including a number of offsets being indicated in the data packet. In some aspects, this may further include indicating, for each of the offset count field being indicated, an offset between the sequence number and a previous sequence number.

At 750, the PDCP layer 715 may transmit or otherwise provide the data packet to the lower layer 720 (e.g., a second protocol layer) for wireless transmission to the receiving device 710.

At 755, the lower layer 720 of transmitting device 705 may perform the wireless transmission of the data packet to receiving device 710, with receiving device 710 receiving the data packet. Accordingly, the receiving device may receive an indication of a sequence number for a data packet and an offset between the sequence number and a contiguous sequence number.

At 760, the lower layer 725 may transmit or otherwise provide the data packet to the PDCP layer 730 for further processing.

At 765, the PDCP layer 730 of receiving device 710 may identify the contiguous sequence number based at least in part on the indicated offset and sequence number. In some aspects this may include recovering the sequence number from a first field of the header portion of the data packet and recovering the offset from an offset status report received separately from the data packet. In some aspects this may include recovering the sequence number from a first field of the header portion of the data packet and recovering the offset from a second field of the header portion of the data packet.

In some aspects, this may include recovering an offset count field in the data packet, with the offset count field comprising a number of offsets being indicated in the data packet. This may further include identifying, for each offset count field being indicated, an offset between the sequence number and the previous sequence number.

770, the PDCP layer 730 of receiving device 710 may perform integrity verification on the data packet according to the sequence number. In some aspects, this may include performing integrity verification on the data portion of the data packet.

At 775, the PDCP layer 730 of receiving device 710 may perform data packet ordering operations according to the contiguous sequence number.

Figure 8:
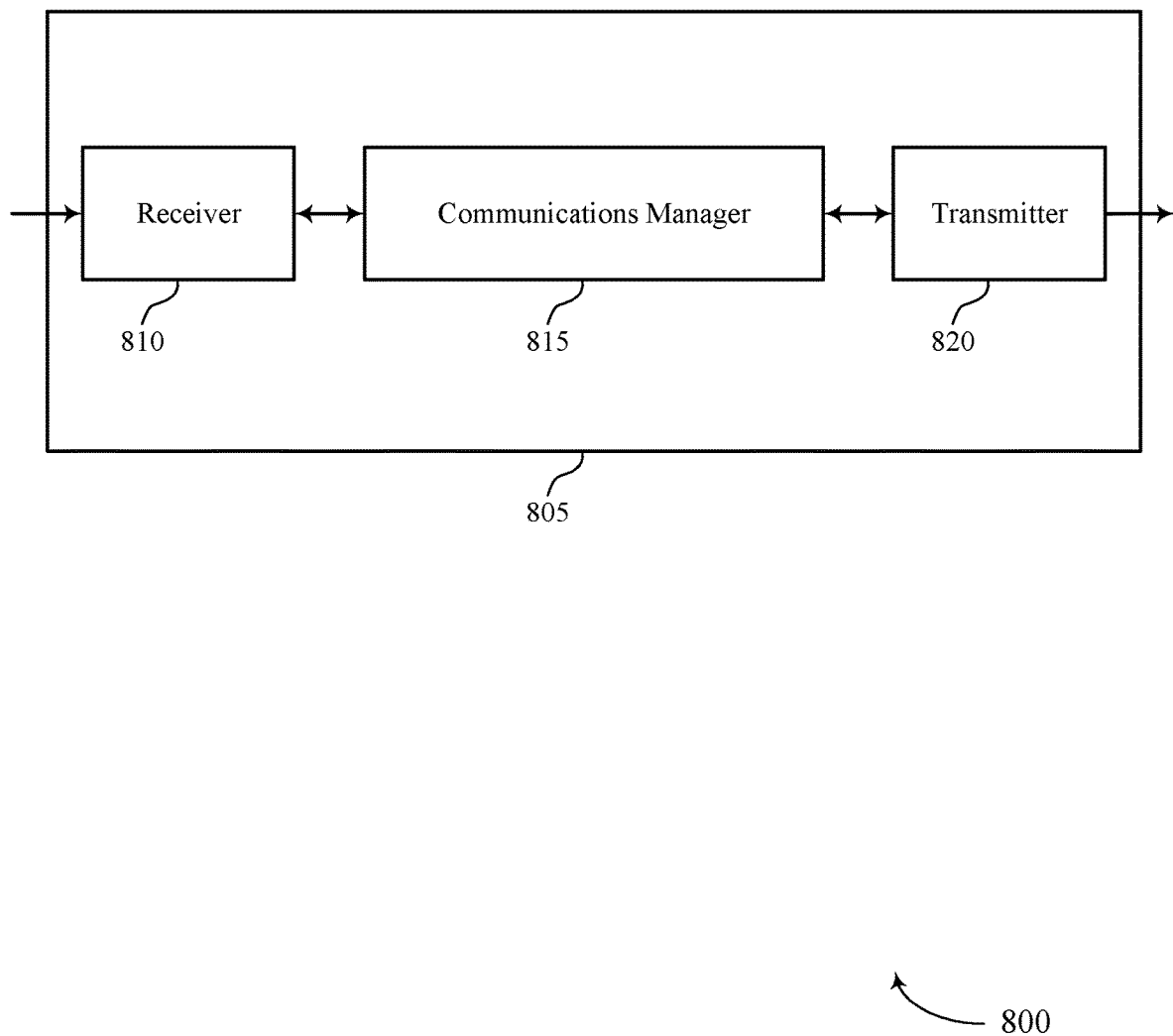
FIGS. 8 and 9 show block diagrams of devices that support integrity protection at PDCP layer, in accordance with one or more aspects of the present disclosure.

FIG. 8 shows a block diagram 800 of a device 805 that supports integrity protection at PDCP layer, in accordance with various aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to integrity protection at PDCP layer, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may associate, at a first protocol layer, a first sequence number to a data packet to perform integrity protection on at least a portion of the data packet, associate, at the first protocol layer, a second sequence number to the data packet for wireless transmission to a second device, indicate an offset between the first sequence number and the second sequence number in the data packet, and transmit the data packet to a second protocol layer for wireless transmission to the second device, the second protocol layer being a lower layer than the first protocol layer.

The communications manager 815 may also receive a data packet from a first device, the data packet indicating an offset between a first sequence number associated with the data packet to perform integrity verification and a second sequence number associated with the data packet for wireless transmission from the first device, identify the first sequence number based on the second sequence number and the indicated offset, perform integrity verification on the data packet according to the first sequence number, and perform data packet ordering operations according to the second sequence number.

The communications manager 815 may also associate, at a first protocol layer, a sequence number to a data packet for wireless transmission to a second device, determine that the sequence number includes a non-contiguous sequence number of a previous data packet for the wireless transmission, indicate an offset between the sequence number of the data packet and the previous data packet, and transmit the data packet to a second protocol layer for wireless transmission to the second device, the second protocol layer being a lower layer than the first protocol layer.

The communications manager 815 may also determine, at a first protocol layer, that a non-sequential condition exists for a sequence number of a data packet being wirelessly transmitted to a second device, indicate an offset between the sequence number and a sequential sequence number based on non-sequential condition, and transmit the data packet to a second protocol layer for wireless transmission to the second device, the second protocol layer being a lower layer than the first protocol layer.

The communications manager 815 may also receive an indication of a sequence number for a data packet and an offset between the sequence number and a contiguous sequence number, identify the contiguous sequence number based on the indicated offset and the sequence number, perform integrity verification on the data packet according to the sequence number, and perform data packet ordering operations according to the contiguous sequence number.

The actions performed by the communications manager 815 as described herein may be implemented to realize one or more potential advantages. One implementation may allow a first device to communicate with a second device more efficiently. For example, the first device may include offset and SN information in a report to the second device, which may allow for improved data throughput from the first device to the second device. Another implementation may provide improved quality and reliability of service at the transmitting and second devices, as latency and the number of separate resources allocated to the devices may be reduced. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
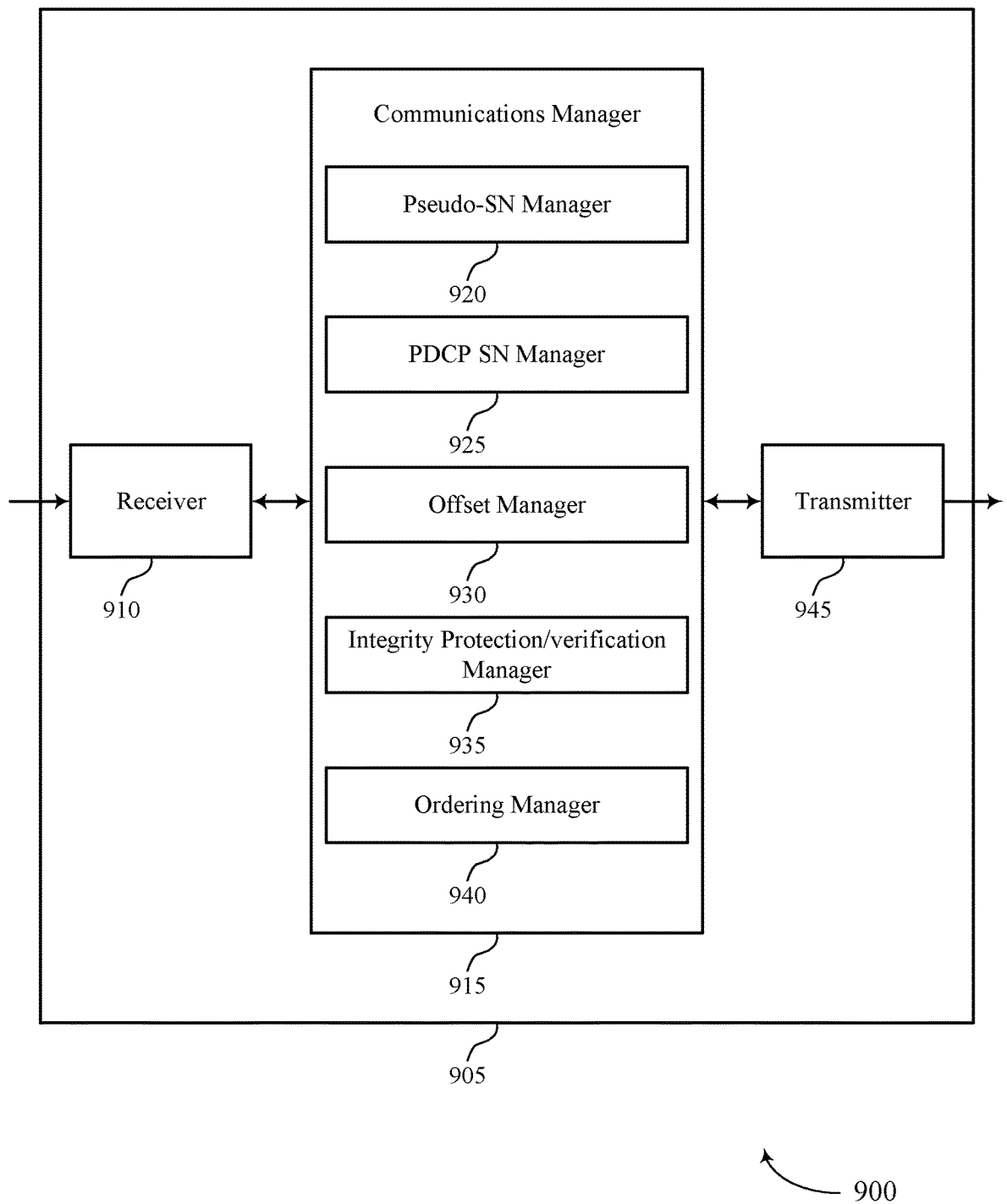

FIG. 9 shows a block diagram 900 of a device 905 that supports integrity protection at PDCP layer, in accordance with various aspects of the present disclosure. The device 905 may be an example of aspects of a device 805, a UE 115, or a base station 105 as described herein. The device 905 may include a receiver 910, a communications manager 915, and a transmitter 945. The device 905 may also include a processor. Each of these components may be in communication with one another (e.g., via one or more buses).

Receiver 910 may receive information such as packets, user data, or control information associated with various information channels (e.g., control channels, data channels, and information related to integrity protection at PDCP layer, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a pseudo-SN manager 920, a PDCP SN manager 925, an offset manager 930, an integrity protection/verification manager 935, and an ordering manager 940. The communications manager 915 may be an example of aspects of the communications manager 1110 or 1210 as described herein.

The pseudo-SN manager 920 may associate, at a first protocol layer, a first sequence number to a data packet to perform integrity protection on at least a portion of the data packet.

The PDCP SN manager 925 may associate, at the first protocol layer, a second sequence number to the data packet for wireless transmission to a second device.

The offset manager 930 may indicate an offset between the first sequence number and the second sequence number in the data packet and transmit the data packet to a second protocol layer for wireless transmission to the second device, the second protocol layer being a lower layer than the first protocol layer.

The offset manager 930 may receive a data packet from a first device, the data packet indicating an offset between a first sequence number associated with the data packet to perform integrity verification and a second sequence number associated with the data packet for wireless transmission from the first device.

The pseudo-SN manager 920 may identify the first sequence number based on the second sequence number and the indicated offset.

The integrity protection/verification manager 935 may perform integrity verification on the data packet according to the first sequence number.

The ordering manager 940 may perform data packet ordering operations according to the second sequence number.

The PDCP SN manager 925 may associate, at a first protocol layer, a sequence number to a data packet for wireless transmission to a second device.

The offset manager 930 may determine that the sequence number includes a non-contiguous sequence number of a previous data packet for the wireless transmission, indicate an offset between the sequence number of the data packet and the previous data packet, and transmit the data packet to a second protocol layer for wireless transmission to the second device, the second protocol layer being a lower layer than the first protocol layer.

The PDCP SN manager 925 may determine, at a first protocol layer, that a non-sequential condition exists for a sequence number of a data packet being wirelessly transmitted to a second device.

The offset manager 930 may indicate an offset between the sequence number and a sequential sequence number based on non-sequential condition and transmit the data packet to a second protocol layer for wireless transmission to the second device, the second protocol layer being a lower layer than the first protocol layer.

The offset manager 930 may receive an indication of a sequence number for a data packet and an offset between the sequence number and a contiguous sequence number.

The PDCP SN manager 925 may identify the contiguous sequence number based on the indicated offset and the sequence number.

The integrity protection/verification manager 935 may perform integrity verification on the data packet according to the sequence number.

The ordering manager 940 may perform data packet ordering operations according to the contiguous sequence number.

Transmitter 945 may transmit signals generated by other components of the device 905. In some examples, the transmitter 945 may be collocated with a receiver 910 in a transceiver module. For example, the transmitter 945 may be an example of aspects of the transceiver 1120 or 1220 as described with reference to FIGS. 11 and 12. The transmitter 945 may utilize a single antenna or a set of antennas.

Figure 10:
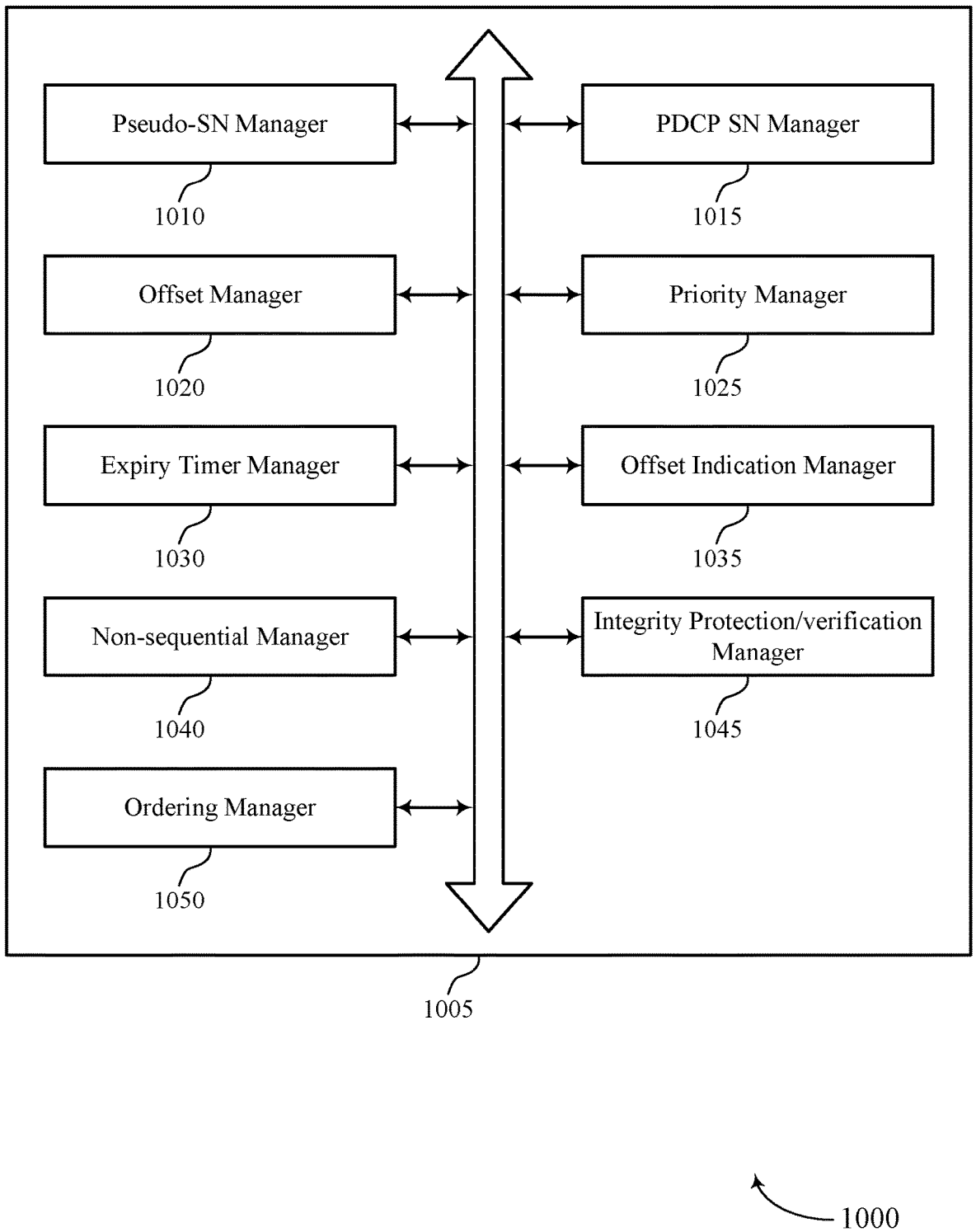
FIG. 10 shows a block diagram of a communications manager that supports integrity protection at PDCP layer, in accordance with one or more aspects of the present disclosure.

FIG. 10 shows a block diagram 1000 of a communications manager 1005 that supports integrity protection at PDCP layer, in accordance with various aspects of the present disclosure. The communications manager 1005 may be an example of aspects of a communications manager 815, a communications manager 915, or a communications manager 1110 described herein. The communications manager 1005 may include a pseudo-SN manager 1010, a PDCP SN manager 1015, an offset manager 1020, a priority manager 1025, an expiry timer manager 1030, an offset indication manager 1035, a non-sequential manager 1040, an integrity protection/verification manager 1045, and an ordering manager 1050. Each of these modules may communicate, directly or indirectly, with one another (e.g., via one or more buses).

The pseudo-SN manager 1010 may associate, at a first protocol layer, a first sequence number to a data packet to perform integrity protection on at least a portion of the data packet. In some examples, the pseudo-SN manager 1010 may identify the first sequence number based on the second sequence number and the indicated offset. In some examples, the pseudo-SN manager 1010 may perform integrity protection on a data portion of the data packet using the first sequence number. In some examples, the pseudo-SN manager 1010 may perform integrity verification on a data portion of the data packet using the first sequence number. In some examples, the pseudo-SN manager 1010 may perform integrity protection on a data portion of the data packet using the sequence number.

In some examples, the pseudo-SN manager 1010 may associate, at the first protocol layer, a first sequence number to a data packet as the sequence number to perform integrity protection on at least a portion of the data packet. In some examples, the pseudo-SN manager 1010 may determine that the second sequence number is different from the first sequence number, where the indication of the offset is based on the second sequence number being different from the first sequence number. In some examples, the pseudo-SN manager 1010 may indicate the second sequence number in a first field of a header portion of the data packet. In some examples, the pseudo-SN manager 1010 may indicate the offset in a second field of the header portion of the data packet. In some cases, the first protocol layer includes a PDCP layer.

The PDCP SN manager 1015 may associate, at the first protocol layer, a second sequence number to the data packet for wireless transmission to a second device. In some examples, the PDCP SN manager 1015 may associate, at a first protocol layer, a sequence number to a data packet for wireless transmission to a second device. In some examples, the PDCP SN manager 1015 may determine, at a first protocol layer, that a non-sequential condition exists for a sequence number of a data packet being wirelessly transmitted to a second device. In some examples, the PDCP SN manager 1015 may identify the contiguous sequence number based on the indicated offset and the sequence number. In some examples, the PDCP SN manager 1015 may associate, at the first protocol layer, a second sequence number to the data packet for wireless transmission to the second device. In some cases, the first protocol layer includes a PDCP layer.

The offset manager 1020 may indicate an offset between the first sequence number and the second sequence number in the data packet. In some examples, the offset manager 1020 may transmit the data packet to a second protocol layer for wireless transmission to the second device, the second protocol layer being a lower layer than the first protocol layer. In some examples, the offset manager 1020 may receive a data packet from a first device, the data packet indicating an offset between a first sequence number associated with the data packet to perform integrity verification and a second sequence number associated with the data packet for wireless transmission from the first device. In some examples, determining that the sequence number includes a non-contiguous sequence number of a previous data packet for the wireless transmission.

In some examples, the offset manager 1020 may indicate an offset between the sequence number of the data packet and the previous data packet. In some examples, the offset manager 1020 may transmit the data packet to a second protocol layer for wireless transmission to the second device, the second protocol layer being a lower layer than the first protocol layer. In some examples, the offset manager 1020 may indicate an offset between the sequence number and a sequential sequence number based on non-sequential condition. In some examples, the offset manager 1020 may transmit the data packet to a second protocol layer for wireless transmission to the second device, the second protocol layer being a lower layer than the first protocol layer. In some examples, the offset manager 1020 may receive an indication of a sequence number for a data packet and an offset between the sequence number and a contiguous sequence number.

The integrity protection/verification manager 1045 may perform integrity verification on the data packet according to the first sequence number. In some examples, the integrity protection/verification manager 1045 may perform integrity verification on the data packet according to the sequence number.

The ordering manager 1050 may perform data packet ordering operations according to the second sequence number. In some examples, the ordering manager 1050 may perform data packet ordering operations according to the contiguous sequence number.

The priority manager 1025 may determine that a priority level associated with the data packet satisfies a threshold. In some examples, the priority manager 1025 may associate the second sequence number to the data packet based on the priority level. In some examples, the priority manager 1025 may determine that a priority level associated with the data packet satisfies a threshold, where the offset is indicated based on the priority level.

The expiry timer manager 1030 may determine that an expiry timer associated with a previously received data packet has expired. In some examples, the expiry timer manager 1030 may associate the second sequence number to the data packet based on the expiry timer expiration. In some examples, the expiry timer manager 1030 may determine that an expiry timer associated with a previously received data packet has expired, where the offset is indicated based on the expiry timer expiration.

The offset indication manager 1035 may indicate the second sequence number in a first field of a header portion of the data packet. In some examples, the offset indication manager 1035 may indicate the offset in a second field of the header portion of the data packet. In some examples, the offset indication manager 1035 may indicate the first sequence number in a header portion of the data packet. In some examples, the offset indication manager 1035 may recover the second sequence number from a first field of a header portion of the data packet.

In some examples, the offset indication manager 1035 may recover the offset from a second field of the header portion of the data packet. In some examples, the offset indication manager 1035 may recover the first sequence number from a header portion of the data packet. In some examples, the offset indication manager 1035 may indicate the sequence number in a first field of a header portion of the data packet. In some examples, the offset indication manager 1035 may indicate the offset in an offset status report that is transmitted separately from the data packet. In some examples, the offset indication manager 1035 may indicate the offset in a second field of the header portion of the data packet. In some examples, the offset indication manager 1035 may indicate an offset count field in the data packet, the offset count field including a number of offsets being indicated in the data packet.

In some examples, the offset indication manager 1035 may indicate, for each offset count field being indicated, an offset between the sequence number and a previous sequence number. In some examples, the offset indication manager 1035 may recover the sequence number from a header portion of the data packet. In some examples, the offset indication manager 1035 may recover the offset from a non-header portion of the data packet. In some examples, the offset indication manager 1035 may recover the sequence number from a first field of a header portion of the data packet. In some examples, the offset indication manager 1035 may recover the offset from an offset status report that is received separately from the data packet.

In some examples, the offset indication manager 1035 may recover the offset from a second field of the header portion of the data packet. In some examples, the offset indication manager 1035 may recover an offset count field in the data packet, the offset count field including a number of offsets being indicated in the data packet. In some examples, the offset indication manager 1035 may identify, for each offset count field being indicated, an offset between the sequence number and the previous sequence number. In some cases, the second field includes one or more reserved fields of the header portion of the data packet.

The non-sequential manager 1040 may determine that the second sequence number is different from the first sequence number, where the data packet indicating the offset is based on the second sequence number being different from the first sequence number. In some examples, the non-sequential manager 1040 may associate, at the first protocol layer, the sequence number to a data packet for wireless transmission to the second device. In some examples, determining that the sequence number includes a non-sequential sequence number for the wireless transmission.

In some examples, the non-sequential manager 1040 may indicate the sequence number in a header portion of the data packet. In some examples, the non-sequential manager 1040 may indicate the offset in a non-header portion of the data packet. In some examples, the non-sequential manager 1040 may indicate the sequence number in a first field of a header portion of the data packet. In some examples, the non-sequential manager 1040 may indicate the offset in an offset status report that separate from the data packet. In some examples, the non-sequential manager 1040 may indicate the offset in a second field of the header portion of the data packet.

Figure 11:
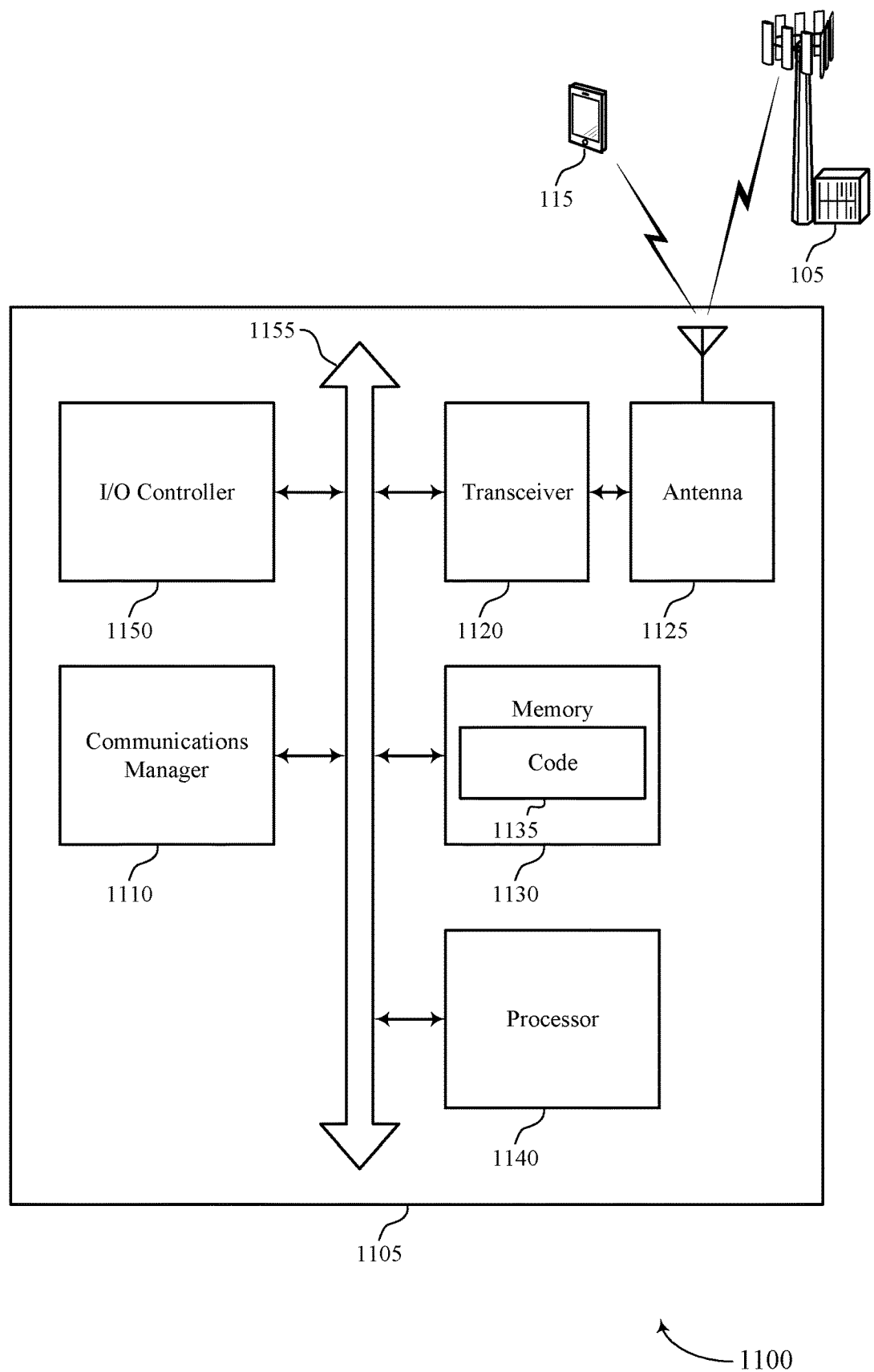
FIG. 11 shows a diagram of a system including a UE that supports integrity protection at PDCP layer, in accordance with one or more aspects of the present disclosure.

FIG. 11 shows a diagram of a system 1100 including a device 1105 that supports integrity protection at PDCP layer, in accordance with various aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may associate, at a first protocol layer, a first sequence number to a data packet to perform integrity protection on at least a portion of the data packet, associate, at the first protocol layer, a second sequence number to the data packet for wireless transmission to a second device, indicate an offset between the first sequence number and the second sequence number in the data packet, and transmit the data packet to a second protocol layer for wireless transmission to the second device, the second protocol layer being a lower layer than the first protocol layer.

The communications manager 1110 may also receive a data packet from a first device, the data packet indicating an offset between a first sequence number associated with the data packet to perform integrity verification and a second sequence number associated with the data packet for wireless transmission from the first device, identify the first sequence number based on the second sequence number and the indicated offset, perform integrity verification on the data packet according to the first sequence number, and perform data packet ordering operations according to the second sequence number.

The communications manager 1110 may also associate, at a first protocol layer, a sequence number to a data packet for wireless transmission to a second device, determine that the sequence number includes a non-contiguous sequence number of a previous data packet for the wireless transmission, indicate an offset between the sequence number of the data packet and the previous data packet, and transmit the data packet to a second protocol layer for wireless transmission to the second device, the second protocol layer being a lower layer than the first protocol layer.

The communications manager 1110 may also determine, at a first protocol layer, that a non-sequential condition exists for a sequence number of a data packet being wirelessly transmitted to a second device, indicate an offset between the sequence number and a sequential sequence number based on non-sequential condition, and transmit the data packet to a second protocol layer for wireless transmission to the second device, the second protocol layer being a lower layer than the first protocol layer.

The communications manager 1110 may also receive an indication of a sequence number for a data packet and an offset between the sequence number and a contiguous sequence number, identify the contiguous sequence number based on the indicated offset and the sequence number, perform integrity verification on the data packet according to the sequence number, and perform data packet ordering operations according to the contiguous sequence number.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting integrity protection at PDCP layer).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
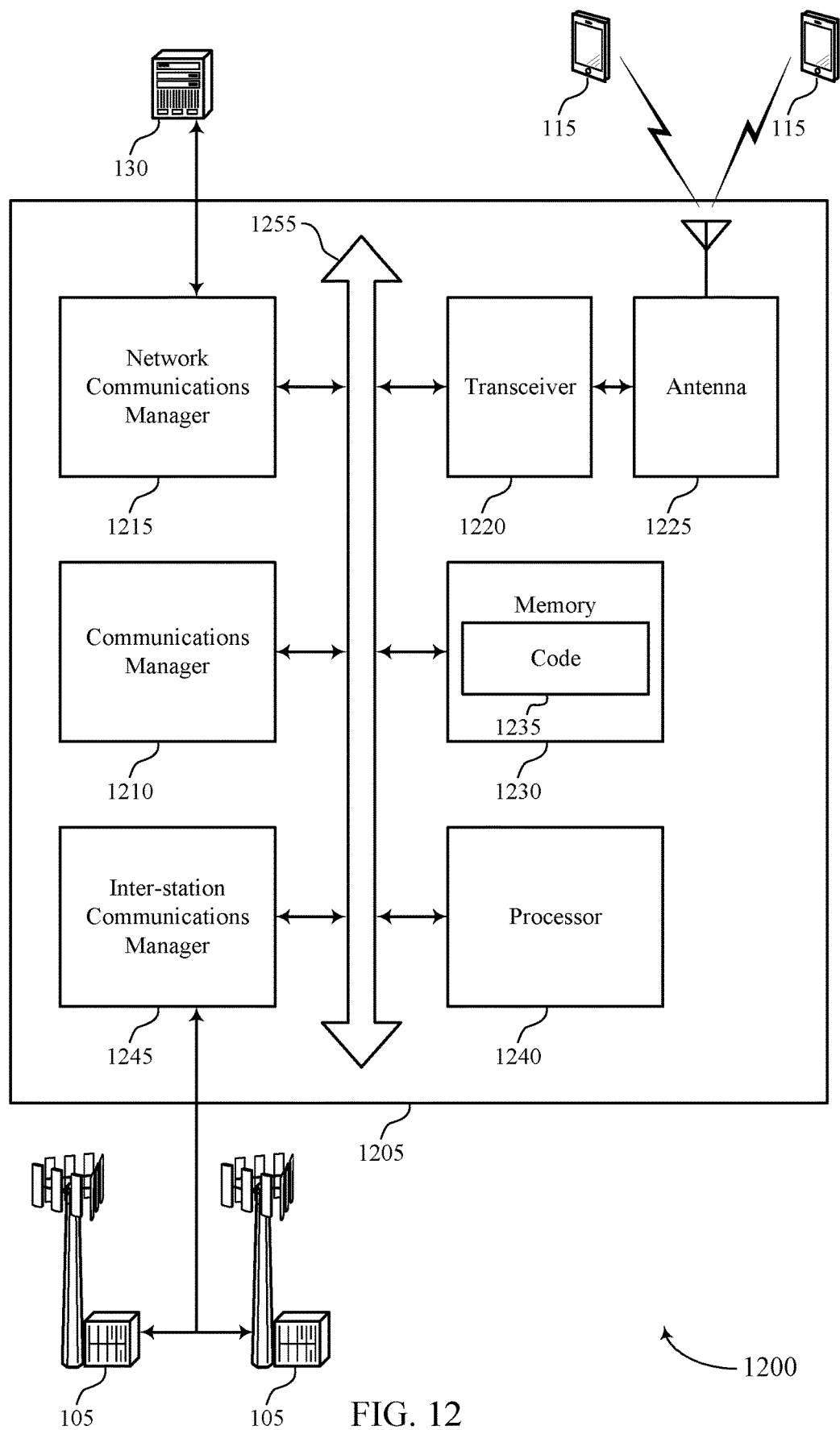
FIG. 12 shows a diagram of a system including a base station that supports integrity protection at PDCP layer, in accordance with one or more aspects of the present disclosure.

FIG. 12 shows a diagram of a system 1200 including a device 1205 that supports integrity protection at PDCP layer, in accordance with various aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may associate, at a first protocol layer, a first sequence number to a data packet to perform integrity protection on at least a portion of the data packet, associate, at the first protocol layer, a second sequence number to the data packet for wireless transmission to a second device, indicate an offset between the first sequence number and the second sequence number in the data packet, and transmit the data packet to a second protocol layer for wireless transmission to the second device, the second protocol layer being a lower layer than the first protocol layer.

The communications manager 1210 may also receive a data packet from a first device, the data packet indicating an offset between a first sequence number associated with the data packet to perform integrity verification and a second sequence number associated with the data packet for wireless transmission from the first device, identify the first sequence number based on the second sequence number and the indicated offset, perform integrity verification on the data packet according to the first sequence number, and perform data packet ordering operations according to the second sequence number.

The communications manager 1210 may also associate, at a first protocol layer, a sequence number to a data packet for wireless transmission to a second device, determine that the sequence number includes a non-contiguous sequence number of a previous data packet for the wireless transmission, indicate an offset between the sequence number of the data packet and the previous data packet, and transmit the data packet to a second protocol layer for wireless transmission to the second device, the second protocol layer being a lower layer than the first protocol layer.

The communications manager 1210 may also determine, at a first protocol layer, that a non-sequential condition exists for a sequence number of a data packet being wirelessly transmitted to a second device, indicate an offset between the sequence number and a sequential sequence number based on non-sequential condition, and transmit the data packet to a second protocol layer for wireless transmission to the second device, the second protocol layer being a lower layer than the first protocol layer.

The communications manager 1210 may also receive an indication of a sequence number for a data packet and an offset between the sequence number and a contiguous sequence number, identify the contiguous sequence number based on the indicated offset and the sequence number, perform integrity verification on the data packet according to the sequence number, and perform data packet ordering operations according to the contiguous sequence number.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting integrity protection at PDCP layer).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
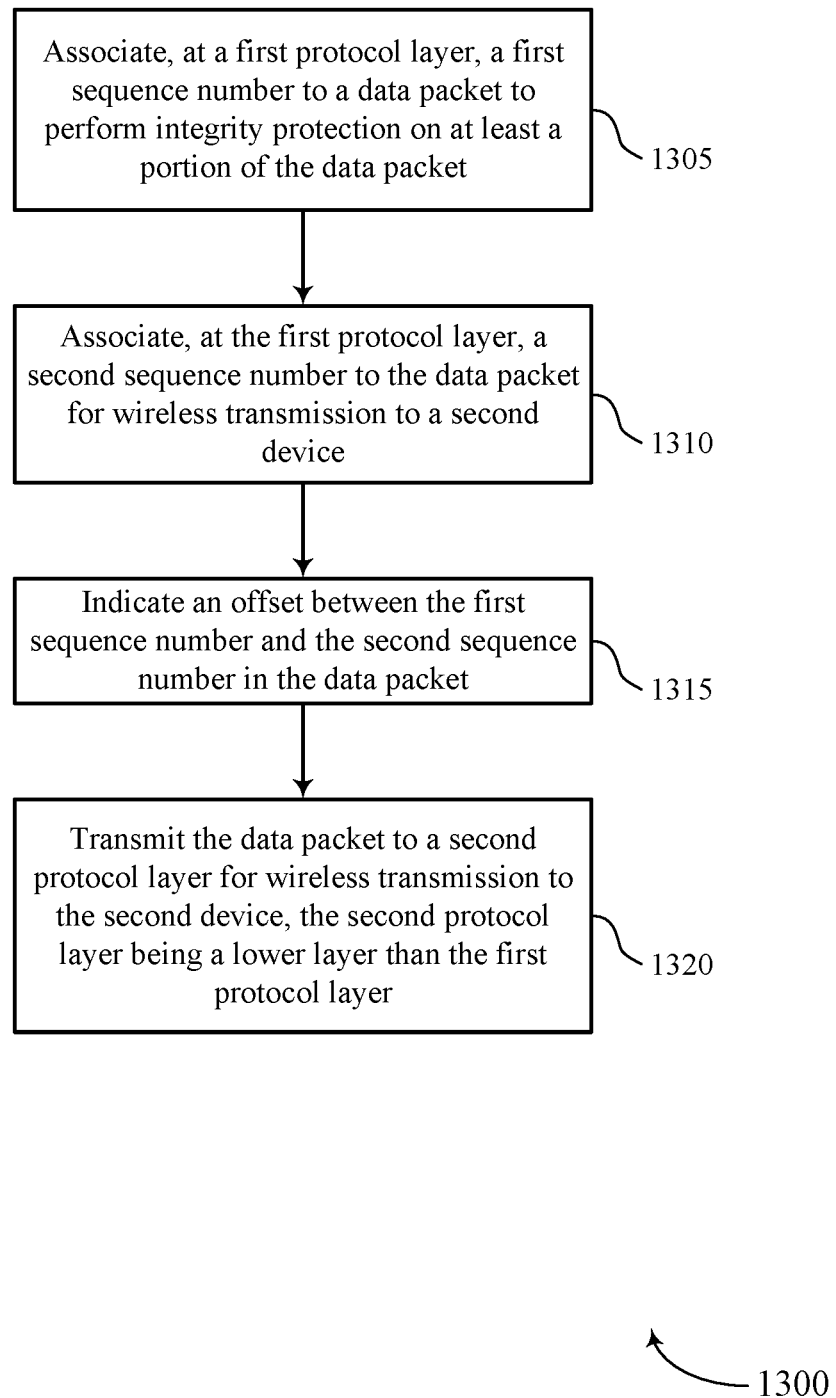
FIGS. 13 through 17 show flowcharts illustrating methods that support integrity protection at PDCP layer, in accordance with one or more aspects of the present disclosure.

FIG. 13 shows a flowchart illustrating a method 1300 that supports integrity protection at PDCP layer, in accordance with various aspects of the present disclosure. The operations of method 1300 may be implemented by a UE 115 or base station 105 or its components as described herein. For example, the operations of method 1300 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may associate, at a first protocol layer, a first sequence number to a data packet to perform integrity protection on at least a portion of the data packet. The operations of 1305 may be performed according to the methods described herein. In some examples, aspects of the operations of 1305 may be performed by a pseudo-SN manager as described with reference to FIGS. 8 through 12.

At 1310, the UE or base station may associate, at the first protocol layer, a second sequence number to the data packet for wireless transmission to a second device. The operations of 1310 may be performed according to the methods described herein. In some examples, aspects of the operations of 1310 may be performed by a PDCP SN manager as described with reference to FIGS. 8 through 12.

At 1315, the UE or base station may indicate an offset between the first sequence number and the second sequence number in the data packet. The operations of 1315 may be performed according to the methods described herein. In some examples, aspects of the operations of 1315 may be performed by an offset manager as described with reference to FIGS. 8 through 12.

At 1320, the UE or base station may transmit the data packet to a second protocol layer for wireless transmission to the second device, the second protocol layer being a lower layer than the first protocol layer. The operations of 1320 may be performed according to the methods described herein. In some examples, aspects of the operations of 1320 may be performed by an offset manager as described with reference to FIGS. 8 through 12.

Figure 14:
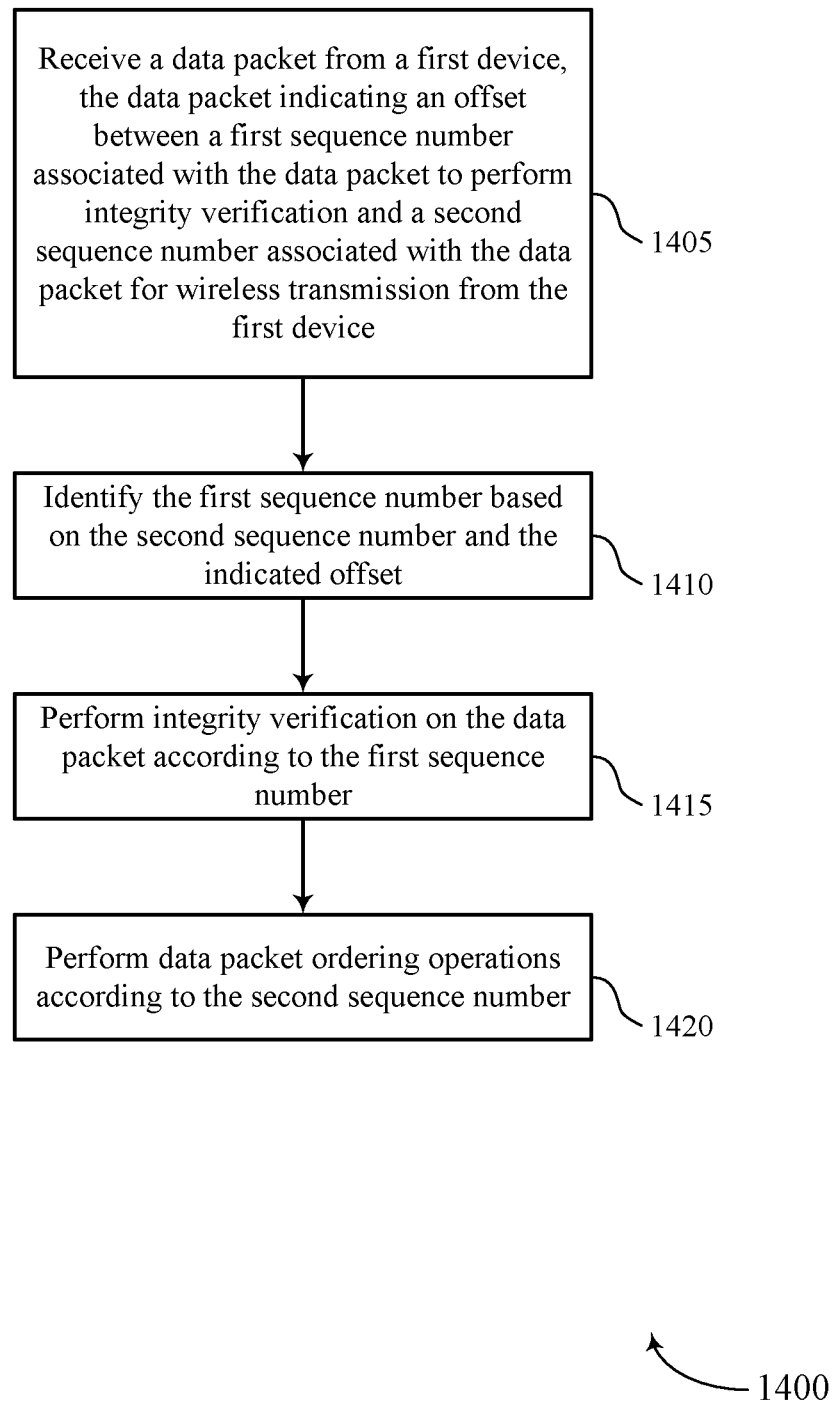

FIG. 14 shows a flowchart illustrating a method 1400 that supports integrity protection at PDCP layer, in accordance with various aspects of the present disclosure. The operations of method 1400 may be implemented by a UE 115 or base station 105 or its components as described herein. For example, the operations of method 1400 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive a data packet from a first device, the data packet indicating an offset between a first sequence number associated with the data packet to perform integrity verification and a second sequence number associated with the data packet for wireless transmission from the first device. The operations of 1405 may be performed according to the methods described herein. In some examples, aspects of the operations of 1405 may be performed by an offset manager as described with reference to FIGS. 8 through 12.

At 1410, the UE or base station may identify the first sequence number based on the second sequence number and the indicated offset. The operations of 1410 may be performed according to the methods described herein. In some examples, aspects of the operations of 1410 may be performed by a pseudo-SN manager as described with reference to FIGS. 8 through 12.

At 1415, the UE or base station may perform integrity verification on the data packet according to the first sequence number. The operations of 1415 may be performed according to the methods described herein. In some examples, aspects of the operations of 1415 may be performed by an integrity protection/verification manager as described with reference to FIGS. 8 through 12.

At 1420, the UE or base station may perform data packet ordering operations according to the second sequence number. The operations of 1420 may be performed according to the methods described herein. In some examples, aspects of the operations of 1420 may be performed by an ordering manager as described with reference to FIGS. 8 through 12.

Figure 15:
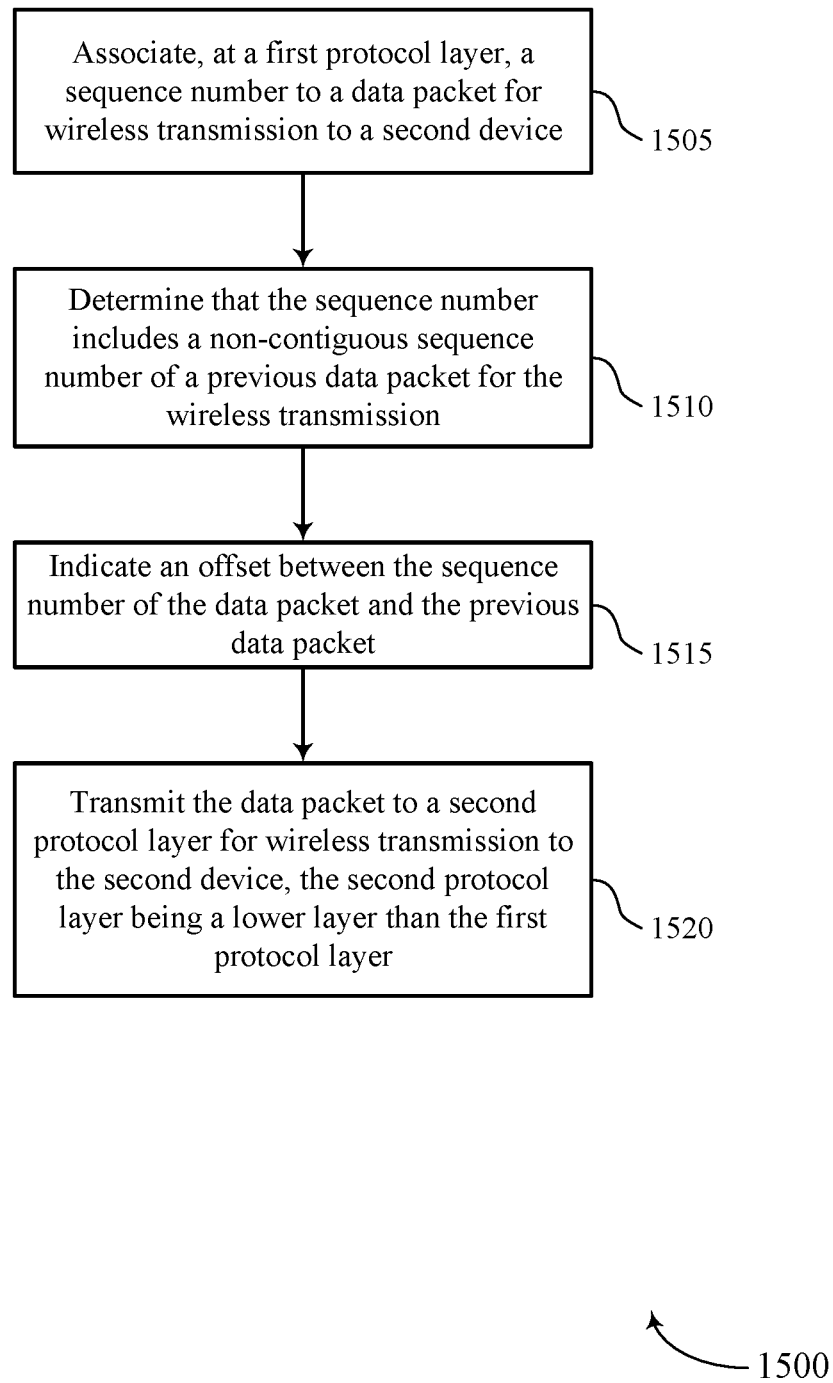

FIG. 15 shows a flowchart illustrating a method 1500 that supports integrity protection at PDCP layer, in accordance with various aspects of the present disclosure. The operations of method 1500 may be implemented by a UE 115 or base station 105 or its components as described herein. For example, the operations of method 1500 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may associate, at a first protocol layer, a sequence number to a data packet for wireless transmission to a second device. The operations of 1505 may be performed according to the methods described herein. In some examples, aspects of the operations of 1505 may be performed by a PDCP SN manager as described with reference to FIGS. 8 through 12.

At 1510, the UE or base station may determine that the sequence number includes a non-contiguous sequence number of a previous data packet for the wireless transmission. The operations of 1510 may be performed according to the methods described herein. In some examples, aspects of the operations of 1510 may be performed by an offset manager as described with reference to FIGS. 8 through 12.

At 1515, the UE or base station may indicate an offset between the sequence number of the data packet and the previous data packet. The operations of 1515 may be performed according to the methods described herein. In some examples, aspects of the operations of 1515 may be performed by an offset manager as described with reference to FIGS. 8 through 12.

At 1520, the UE or base station may transmit the data packet to a second protocol layer for wireless transmission to the second device, the second protocol layer being a lower layer than the first protocol layer. The operations of 1520 may be performed according to the methods described herein. In some examples, aspects of the operations of 1520 may be performed by an offset manager as described with reference to FIGS. 8 through 12.

Figure 16:
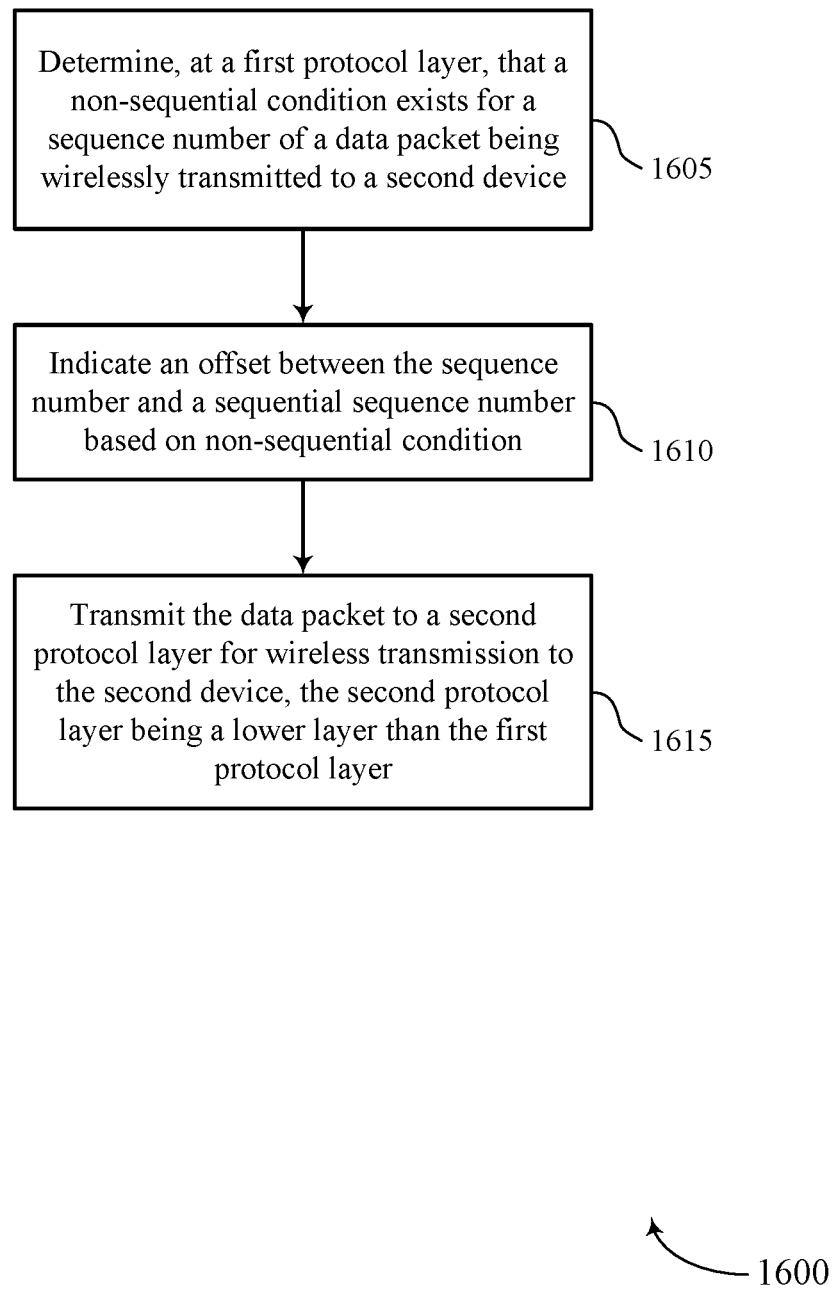

FIG. 16 shows a flowchart illustrating a method 1600 that supports integrity protection at PDCP layer, in accordance with various aspects of the present disclosure. The operations of method 1600 may be implemented by a UE 115 or base station 105 or its components as described herein. For example, the operations of method 1600 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may determine, at a first protocol layer, that a non-sequential condition exists for a sequence number of a data packet being wirelessly transmitted to a second device. The operations of 1605 may be performed according to the methods described herein. In some examples, aspects of the operations of 1605 may be performed by a PDCP SN manager as described with reference to FIGS. 8 through 12.

At 1610, the UE or base station may indicate an offset between the sequence number and a sequential sequence number based on non-sequential condition. The operations of 1610 may be performed according to the methods described herein. In some examples, aspects of the operations of 1610 may be performed by an offset manager as described with reference to FIGS. 8 through 12.

At 1615, the UE or base station may transmit the data packet to a second protocol layer for wireless transmission to the second device, the second protocol layer being a lower layer than the first protocol layer. The operations of 1615 may be performed according to the methods described herein. In some examples, aspects of the operations of 1615 may be performed by an offset manager as described with reference to FIGS. 8 through 12.

Figure 17:
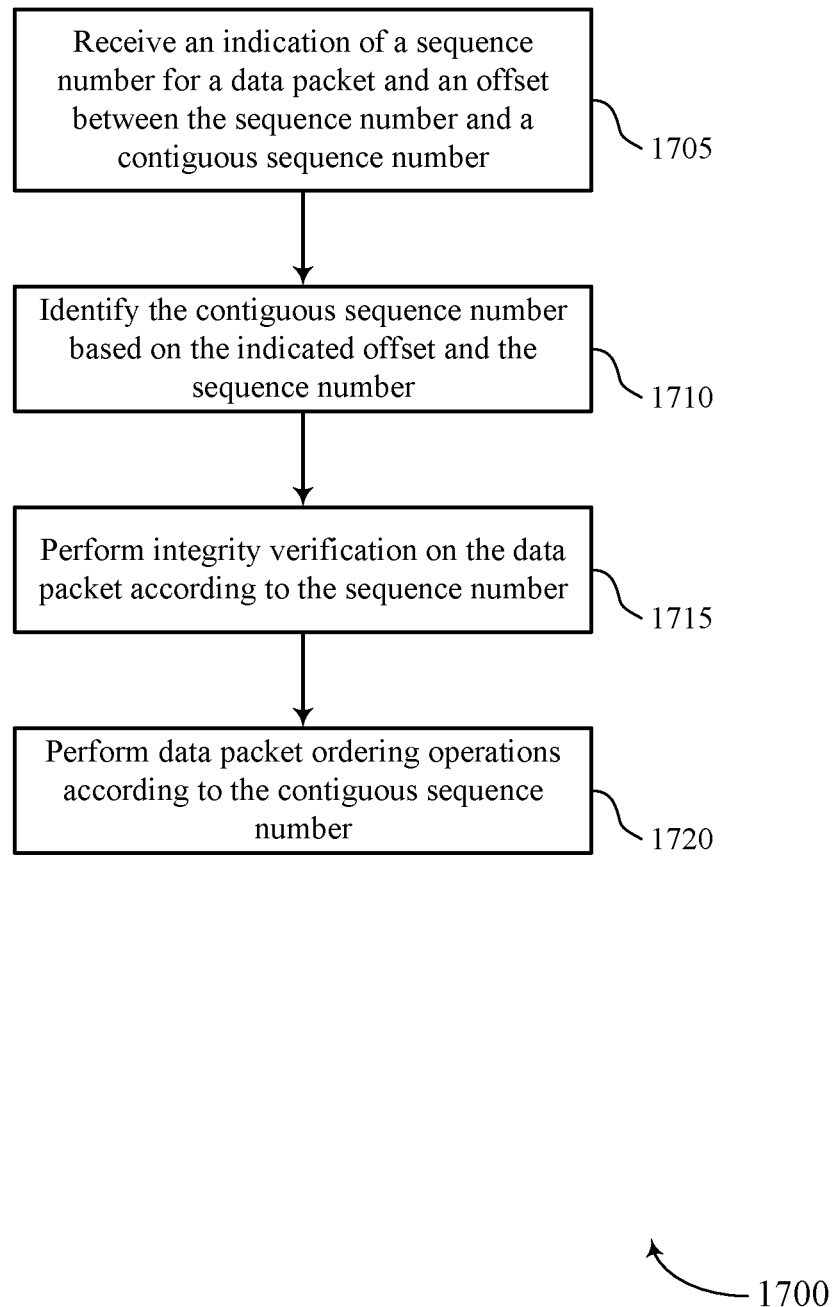

FIG. 17 shows a flowchart illustrating a method 1700 that supports integrity protection at PDCP layer, in accordance with various aspects of the present disclosure. The operations of method 1700 may be implemented by a UE 115 or base station 105 or its components as described herein. For example, the operations of method 1700 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may receive an indication of a sequence number for a data packet and an offset between the sequence number and a contiguous sequence number. The operations of 1705 may be performed according to the methods described herein. In some examples, aspects of the operations of 1705 may be performed by an offset manager as described with reference to FIGS. 8 through 12.

At 1710, the UE or base station may identify the contiguous sequence number based on the indicated offset and the sequence number. The operations of 1710 may be performed according to the methods described herein. In some examples, aspects of the operations of 1710 may be performed by a PDCP SN manager as described with reference to FIGS. 8 through 12.

At 1715, the UE or base station may perform integrity verification on the data packet according to the sequence number. The operations of 1715 may be performed according to the methods described herein. In some examples, aspects of the operations of 1715 may be performed by an integrity protection/verification manager as described with reference to FIGS. 8 through 12.

At 1720, the UE or base station may perform data packet ordering operations according to the contiguous sequence number. The operations of 1720 may be performed according to the methods described herein. In some examples, aspects of the operations of 1720 may be performed by an ordering manager as described with reference to FIGS. 8 through 12.

It should be noted that the methods described herein describe possible implementations, and that the operations and the steps may be rearranged or otherwise modified and that other implementations are possible. Further, aspects from two or more of the methods may be combined.

Example 1

A method for wireless communication at a first device, comprising: associating, at a first protocol layer, a first sequence number to a data packet to perform integrity protection on at least a portion of the data packet; associating, at the first protocol layer, a second sequence number to the data packet for wireless transmission to a second device; indicating an offset between the first sequence number and the second sequence number in the data packet; and transmitting the data packet to a second protocol layer for wireless transmission to the second device, the second protocol layer being a lower layer than the first protocol layer.

Example 2

The method of example 1, further comprising: determining that a priority level associated with the data packet satisfies a threshold; and associating the second sequence number to the data packet based at least in part on the priority level.

Example 3

The method of any of examples 1 or 2, further comprising: determining that an expiry timer associated with a previously received data packet has expired; and associating the second sequence number to the data packet based at least in part on the expiry timer expiration.

Example 4

The method of any of examples 1 to 3, wherein indicating the offset comprises: indicating the second sequence number in a first field of a header portion of the data packet; and indicating the offset in a second field of the header portion of the data packet.

Example 5

The method of any of examples 1 to 4, further comprising: performing integrity protection on a data portion of the data packet using the first sequence number.

Example 6

The method of any of examples 1 to 5, further comprising: determining that the second sequence number is different from the first sequence number, wherein the data packet indicating the offset is based at least in part on the second sequence number being different from the first sequence number.

Example 7

The method of any of examples 1 to 6, further comprising: indicating the first sequence number in a header portion of the data packet.

Example 8

The method of any of examples 1 to 7, wherein the first protocol layer comprises a packet data convergence protocol layer.

Example 9

An apparatus for wireless communications comprising a processor; memory in electronic communication with the processor; and instructions stored in the memory and executable by the processor to cause the apparatus to perform a method of any of examples 1 to 8.

Example 10

A non-transitory computer-readable medium storing code for wireless communications, the code comprising instructions executable by a processor to perform a method of any of examples 1 to 8.

Example 11

An apparatus, comprising means for performing the method of any of examples 1 to 8.

Example 12

A method for wireless communication at a second device, comprising: receiving a data packet from a first device, the data packet indicating an offset between a first sequence number associated with the data packet to perform integrity verification and a second sequence number associated with the data packet for wireless transmission from the first device; identifying the first sequence number based at least in part on the second sequence number and the indicated offset; performing integrity verification on the data packet according to the first sequence number; and performing data packet ordering operations according to the second sequence number.

Example 13

The method of example 12, further comprising: recovering the second sequence number from a first field of a header portion of the data packet; and recovering the offset from a second field of the header portion of the data packet.

Example 14

The method of any of examples 12 or 13, further comprising: recovering the first sequence number from a header portion of the data packet.

Example 15

The method of any of examples 12 to 14, further comprising: performing integrity verification on a data portion of the data packet using the first sequence number.

Example 16

An apparatus for wireless communications comprising a processor; memory in electronic communication with the processor; and instructions stored in the memory and executable by the processor to cause the apparatus to perform a method of any of examples 12 to 15.

Example 17

A non-transitory computer-readable medium storing code for wireless communications, the code comprising instructions executable by a processor to perform a method of any of examples 12 to 15.

Example 18

An apparatus, comprising means for performing the method of any of examples 12 to 15.

Example 19

A method for wireless communication at a first device, comprising: associating, at a first protocol layer, a sequence number to a data packet for wireless transmission to a second device; determining that the sequence number comprises a non-contiguous sequence number of a previous data packet for the wireless transmission; indicating an offset between the sequence number of the data packet and the previous data packet; and transmitting the data packet to a second protocol layer for wireless transmission to the second device, the second protocol layer being a lower layer than the first protocol layer.

Example 20

The method of example 19, further comprising: determining that a priority level associated with the data packet satisfies a threshold, wherein the offset is indicated based at least in part on the priority level.

Example 21

The method of any of examples 19 or 20, further comprising: determining that an expiry timer associated with a previously received data packet has expired, wherein the offset is indicated based at least in part on the expiry timer expiration.

Example 22

The method of any of examples 19 to 21, wherein indicating the offset comprises: indicating the sequence number in a first field of a header portion of the data packet; and indicating the offset in an offset status report that is transmitted separately from the data packet.

Example 23

The method of any of examples 19 to 22, wherein indicating the offset comprises: indicating the sequence number in a first field of a header portion of the data packet; and indicating the offset in a second field of the header portion of the data packet.

Example 24

The method of any of examples 19 to 23, wherein the second field comprises one or more reserved fields of the header portion of the data packet.

Example 25

The method of any of examples 19 to 24, wherein indicating the offset comprises: indicating an offset count field in the data packet, the offset count field comprising a number of offsets being indicated in the data packet.

Example 26

The method of any of examples 19 to 25, further comprising: indicating, for each offset count field being indicated, an offset between the sequence number and a previous sequence number.

Example 27

The method of any of examples 19 to 26, further comprising: performing integrity protection on a data portion of the data packet using the sequence number.

Example 28

The method of any of examples 19 to 27, wherein the first protocol layer comprises a packet data convergence protocol layer.

Example 29

An apparatus for wireless communications comprising a processor; memory in electronic communication with the processor; and instructions stored in the memory and executable by the processor to cause the apparatus to perform a method of any of examples 19 to 28.

Example 30

A non-transitory computer-readable medium storing code for wireless communications, the code comprising instructions executable by a processor to perform a method of any of examples 19 to 28.

Example 31

An apparatus, comprising means for performing the method of any of examples 19 to 28.

Example 32

A method for wireless communication at a first device, comprising: determining, at a first protocol layer, that a non-sequential condition exists for a sequence number of a data packet being wirelessly transmitted to a second device; indicating an offset between the sequence number and a sequential sequence number based at least in part on non-sequential condition; and transmitting the data packet to a second protocol layer for wireless transmission to the second device, the second protocol layer being a lower layer than the first protocol layer.

Example 33

The method of example 32, wherein determining that the non-sequential condition exists comprises: associating, at the first protocol layer, a first sequence number to a data packet as the sequence number to perform integrity protection on at least a portion of the data packet; and associating, at the first protocol layer, a second sequence number to the data packet for wireless transmission to the second device.

Example 34

The method of any of examples 32 or 33, further comprising: determining that the second sequence number is different from the first sequence number, wherein the indication of the offset is based at least in part on the second sequence number being different from the first sequence number.

Example 35

The method of any of examples 32 to 34, wherein indicating the offset comprises: indicating the second sequence number in a first field of a header portion of the data packet; and indicating the offset in a second field of the header portion of the data packet.

Example 36

The method of any of examples 32 to 35, wherein determining that the non-sequential condition exists comprises: associating, at the first protocol layer, the sequence number to a data packet for wireless transmission to the second device; and determining that the sequence number comprises a non-sequential sequence number for the wireless transmission.

Example 37

The method of any of examples 32 to 36, wherein indicating the offset comprises: indicating the sequence number in a header portion of the data packet; and indicating the offset in a non-header portion of the data packet.

Example 38

The method of any of examples 32 to 37, wherein indicating the offset comprises: indicating the sequence number in a first field of a header portion of the data packet; and indicating the offset in an offset status report that separate from the data packet.

Example 39

The method of any of examples 32 to 38, wherein indicating the offset comprises: indicating the sequence number in a first field of a header portion of the data packet; and indicating the offset in a second field of the header portion of the data packet.

Example 40

The method of any of examples 32 to 39, wherein the first protocol layer comprises a packet data convergence protocol layer.

Example 41

An apparatus for wireless communications comprising a processor; memory in electronic communication with the processor; and instructions stored in the memory and executable by the processor to cause the apparatus to perform a method of any of examples 32 to 40.

Example 42

A non-transitory computer-readable medium storing code for wireless communications, the code comprising instructions executable by a processor to perform a method of any of examples 32 to 40.

Example 43

An apparatus, comprising means for performing the method of any of examples 32 to 40.

Example 44

A method for wireless communication at a second device, comprising: receiving an indication of a sequence number for a data packet and an offset between the sequence number and a contiguous sequence number; identifying the contiguous sequence number based at least in part on the indicated offset and the sequence number; performing integrity verification on the data packet according to the sequence number; and performing data packet ordering operations according to the contiguous sequence number.

Example 45

The method of example 44, further comprising: recovering the sequence number from a header portion of the data packet; and recovering the offset from a non-header portion of the data packet.

Example 46

The method of any of examples 44 or 45, further comprising: recovering the sequence number from a first field of a header portion of the data packet; and recovering the offset from an offset status report that is received separately from the data packet.

Example 47

The method of any of examples 44 to 46, further comprising: recovering the sequence number from a first field of a header portion of the data packet; and recovering the offset from a second field of the header portion of the data packet.

Example 48

The method of any of examples 44 to 47, further comprising: recovering an offset count field in the data packet, the offset count field comprising a number of offsets being indicated in the data packet.

Example 49

The method of any of examples 44 to 48, further comprising: identifying, for each offset count field being indicated, an offset between the sequence number and the previous sequence number.

Example 50

An apparatus for wireless communications comprising a processor; memory in electronic communication with the processor; and instructions stored in the memory and executable by the processor to cause the apparatus to perform a method of any of examples 44 to 49.

Example 51

A non-transitory computer-readable medium storing code for wireless communications, the code comprising instructions executable by a processor to perform a method of any of examples 44 to 49.

Example 52

An apparatus, comprising means for performing the method of any of examples 44 to 49.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and global system for mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:
   associating, at a first protocol layer, a first sequence number to a data packet to perform integrity protection on at least a portion of the data packet;
   determining that a priority level associated with the data packet satisfies a threshold;
   determining that a packet expiry timer associated with a previously received data packet has expired;
   associating, at the first protocol layer, a second sequence number, different than the first sequence number, to the data packet for wireless transmission to a second device based at least in part on the packet expiry timer expiration and based at least in part on the priority level, wherein a length of the second sequence number is the same as a length of the first sequence number;
   indicating an offset between the first sequence number and the second sequence number in the data packet, wherein the offset is separate from the first sequence number and the second sequence number, and wherein the data packet indicating the offset is based at least in part on the second sequence number being different from the first sequence number; and
   transmitting the data packet, including the second sequence number and the offset, to a second protocol layer for wireless transmission to the second device, the second protocol layer being a lower layer than the first protocol layer.

2. The method of claim 1, wherein indicating the offset comprises:
   indicating the second sequence number in a first field of a header portion of the data packet; and
   indicating the offset in a second field of the header portion of the data packet.

3. The method of claim 1, further comprising:
   performing integrity protection on a data portion of the data packet using the first sequence number.

4. The method of claim 1, further comprising:
   indicating the first sequence number in a header portion of the data packet.

5. The method of claim 1, wherein the first protocol layer comprises a packet data convergence protocol layer.

6. A method for wireless communication at a second device, comprising:
   receiving a data packet from a first device, the data packet including an offset between a first sequence number associated with the data packet to perform integrity verification and a second sequence number associated with the data packet for wireless transmission from the first device, wherein the second sequence number is included in the data packet based at least in part on a packet expiry timer associated with a previous data packet expiring and based at least in part on a priority level associated with the data packet satisfying a threshold, and wherein the data packet including the offset is based at least in part on the second sequence number being different from the first sequence number;
   identifying the first sequence number based at least in part on the second sequence number and the indicated offset, wherein the offset is separate from the first sequence number and the second sequence number, and wherein a length of the second sequence number is the same as a length of the first sequence number;
   performing integrity verification on the data packet according to the first sequence number; and
   performing data packet ordering operations according to the second sequence number.

7. The method of claim 6, further comprising:
   recovering the second sequence number from a first field of a header portion of the data packet; and
   recovering the offset from a second field of the header portion of the data packet.

8. The method of claim 6, further comprising:
   recovering the first sequence number from a header portion of the data packet.

9. The method of claim 6, further comprising:
   performing integrity verification on a data portion of the data packet using the first sequence number.

10. A first device, comprising:
    at least one processor; and
    at least one memory coupled to the at least one processor, the at least one memory comprising instructions executable by the at least one processor to cause the at least one processor to:
    associate, at a first protocol layer, a first sequence number to a data packet to perform integrity protection on at least a portion of the data packet;
    determine that a priority level associated with the data packet satisfies a threshold;
    determine that a packet expiry timer associated with a previously received data packet has expired;
    associate, at the first protocol layer, a second sequence number, different than the first sequence number, to the data packet for wireless transmission to a second device based at least in part on the packet expiry timer expiration and based at least in part on the priority level, wherein a length of the second sequence number is the same as a length of the first sequence number;
    indicate an offset between the first sequence number and the second sequence number in the data packet, wherein the offset is separate from the first sequence number and the second sequence number, and wherein the data packet indicating the offset is based at least in part on the second sequence number being different from the first sequence number; and
    transmit the data packet, including the second sequence number and the offset, to a second protocol layer for wireless transmission to the second device, the second protocol layer being a lower layer than the first protocol layer.

11. The first device of claim 10, wherein the instructions are further executable by the at least one processor to:
  indicate the second sequence number in a first field of a header portion of the data packet; and
  indicate the offset in a second field of the header portion of the data packet.

12. The first device of claim 10, wherein the instructions are further executable by the at least one processor to:
  perform integrity protection on a data portion of the data packet using the first sequence number.

13. The first device of claim 10, wherein the instructions are further executable by the at least one processor to:
  indicate the first sequence number in a header portion of the data packet.

14. The first device of claim 10, wherein the first protocol layer comprises a packet data convergence protocol layer.

15. A second device, comprising:
  at least one processor; and
  at least one memory coupled to the at least one processor, the at least one memory comprising instructions executable by the at least one processor to cause the at least one processor to:
  receive a data packet from a first device, the data packet including an offset between a first sequence number associated with the data packet to perform integrity verification and a second sequence number associated with the data packet for wireless transmission from the first device, wherein the second sequence number is included in the data packet based at least in part on a packet expiry timer associated with a previous data packet expiring and based at least in part on a priority level associated with the data packet satisfying a threshold, and wherein the data packet including the offset is based at least in part on the second sequence number being different from the first sequence number;
  identify the first sequence number based at least in part on the second sequence number and the indicated offset, wherein the offset is separate from the first sequence number and the second sequence number, and wherein a length of the second sequence number is the same as a length of the first sequence number;
  perform integrity verification on the data packet according to the first sequence number; and
  perform data packet ordering operations according to the second sequence number.

16. The second device of claim 15, wherein the instructions are further executable by the at least one processor to:
  recover the second sequence number from a first field of a header portion of the data packet; and
  recover the offset from a second field of the header portion of the data packet.

17. The second device of claim 15, wherein the instructions are further executable by the at least one processor to:
  recover the first sequence number from a header portion of the data packet.

18. The second device of claim 15, wherein the instructions are further executable by the at least one processor to:
  perform integrity verification on a data portion of the data packet using the first sequence number.

* * * * *